US012737453B1

(12) United States Patent
Thamilselvan et al.

(10) Patent No.: US 12,737,453 B1
(45) Date of Patent: Sep. 15, 2026

(54) SECURITY ARCHITECTURE GENERATOR PLATFORM

(71) Applicant: ExlService Holdings, Inc., New York, NY (US)

(72) Inventors: Thiruvenkadam Thamilselvan, Chennai (IN); Rambir Singh, Noida (IN); Debasish Sahoo, Hyderabad (IN); Rucha Pattnaik, Bhubaneswar (IN); Sahil Garg, Bathinda (IN); Amit Kapoor, Delhi (IN); Rajesh Kumar, Noida (IN); Telmo Neto, Dublin (IE)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 19/648,387

(22) Filed: Apr. 15, 2026

(51) Int. Cl.
*G06F 21/55* (2013.01)
*G06F 16/334* (2025.01)
*G06F 21/57* (2013.01)

(52) U.S. Cl.
CPC .......... *G06F 21/55* (2013.01); *G06F 16/3347* (2019.01); *G06F 21/577* (2013.01)

(58) Field of Classification Search
CPC ..... G06F 21/55; G06F 16/3347; G06F 21/577
See application file for complete search history.

(56) References Cited

U.S. PATENT DOCUMENTS

| | | | | |
|---|---|---|---|---|
| 2025/0077863 | A1* | 3/2025 | Witzgall | G06F 40/30 |
| 2025/0139086 | A1* | 5/2025 | Garcia-Sanchez | G06F 16/243 |
| 2026/0024034 | A1* | 1/2026 | Baranwal | G06Q 10/06312 |
| 2026/0099537 | A1* | 4/2026 | Gracia-Tinedo | G06F 16/316 |
| 2026/0133771 | A1* | 5/2026 | Rathakrishnan | G06F 8/35 |

* cited by examiner

*Primary Examiner* — Kyung H Shin
(74) *Attorney, Agent, or Firm* — Ashurst Perkins Coie

(57) ABSTRACT

Disclosed are techniques for security architecture generation using artificial intelligence. A computing system receives an architecture artifact and applies a computer vision model to extract an architectural component set and interconnection information, including icons and directionality information. The system generates a node collection based on the extracted components and performs vulnerability analysis by transforming nodes into vector embeddings and performing policy embedding search operations using vector similarity matching against a vector database storing policy data. The system generates a vulnerability artifact comprising a component set, a vulnerability set, and a policy item set, and applies an artificial intelligence model to generate a remediation recommendation specifying architectural changes. An architecture generator outputs a dynamically generated node collection representing a security-enhanced architecture by embedding security components based on the vulnerability set, remediation recommendation, and compliance policies. The system uses the dynamically generated node collection to generate domain-specific language code executable to render a visual architecture diagram.

20 Claims, 10 Drawing Sheets

Processor 154

Wireless Communication Circuitry 156

Display 158

Memory 160

Authentication engine 162

Credit mgmt Engine 164

Multi-Agent Orchestrator 165

Image Processor Agent 166

Policy Application Agent 167

Diagram Generator Agent 168

Database 170

134

136

SECURITY ARCHITECTURE GENERATOR PLATFORM

BACKGROUND

Security architecture e review includes evaluating system designs, configurations, and components to identify vulnerabilities, ensure compliance with security policies, and recommend remediation measures. System designs include structural blueprints and topological arrangements that define how computing resources are organized and interconnected, including network architecture diagrams, data flow diagrams, deployment architectures, and infrastructure layouts. Configurations refer to the settings, parameters, and operational states that govern how system elements function, including firewall rules, access control lists, encryption settings, authentication protocols, network segmentation policies, and service endpoint configurations. Components refer to the discrete functional units within a system architecture, including servers, databases, load balancers, application programming interfaces (APIs), microservices, containers, virtual machines, storage systems, identity providers, message queues, and network devices such as routers, switches, and gateways.

Conventional approaches to security architecture review are predominantly manual processes that require security architects and analysts to examine system diagrams, documentation, and configurations to assess potential security risks. Manual security architecture reviews typically involve security professionals visually inspecting architecture diagrams, checking documentation against security policies and compliance frameworks, conducting interviews with system owners, and documenting findings in spreadsheets or reports. These manual review processes are time-consuming, resource-intensive, and prone to human error, particularly as system architectures grow increasingly complex with distributed components, cloud-based services, and interconnected dependencies.

BRIEF DESCRIPTION OF THE DRAWINGS

Detailed descriptions of implementations of the present invention will be described and explained through the use of the accompanying drawings.

Figure 1A:
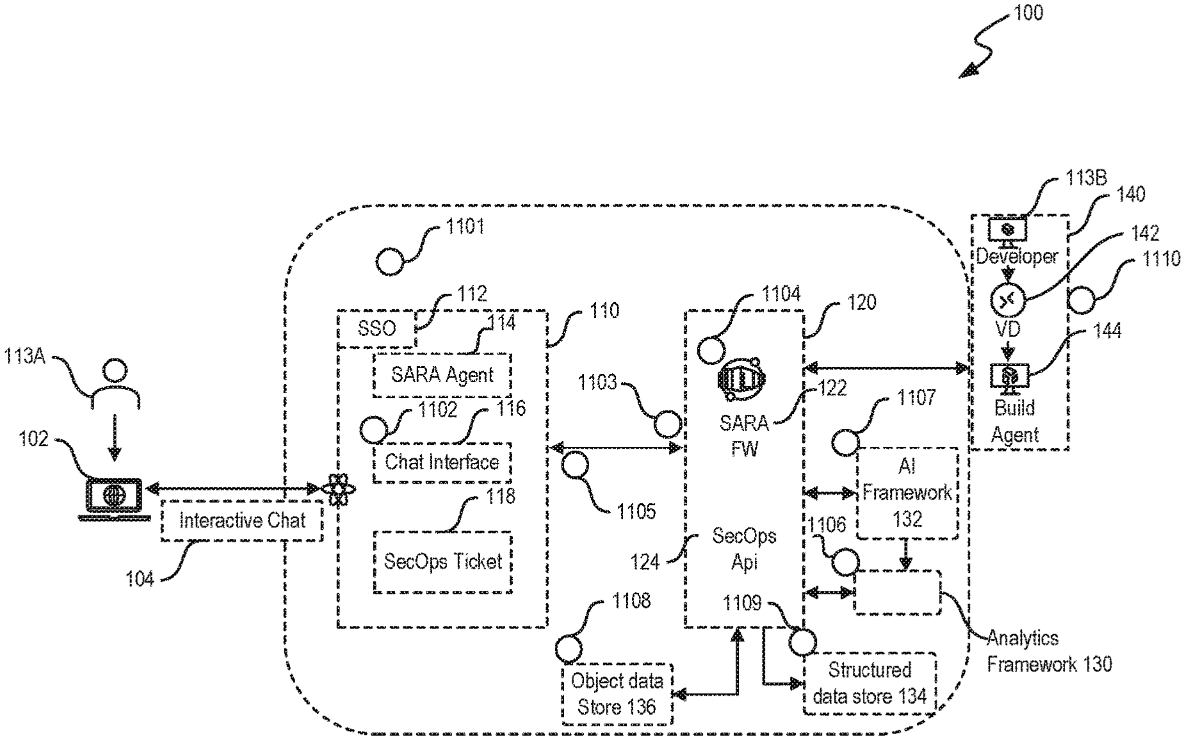
FIG. 1A is a block diagram that illustrates a security architecture review automation platform that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Conventional security architecture review systems suffer from several deficiencies, including delayed or missed identification of security vulnerabilities, particularly in complex system topologies. Vulnerabilities are weaknesses, flaws, or gaps in system architectures that can be exploited by malicious actors to compromise confidentiality, integrity, and/or availability of data and services. Vulnerabilities can arise from improper component configurations, inadequate access controls, missing encryption mechanisms, insecure network segmentation, unprotected data flows between services, and/or architectural arrangements that expose sensitive resources to unauthorized access. Security and compliance policies define rules, constraints, and requirements that govern permissible component arrangements, configurations, and interconnections within system architectures. Policies can prohibit certain component arrangements that result in vulnerabilities. For example, a policy may prohibit direct connections between public-facing load balancers and internal databases without intervening firewall or access control components, as such an arrangement creates a vulnerability that exposes sensitive data to external threats. Similarly, a policy may require encryption services between data storage components and application services, wherein the absence of such encryption services constitutes a vulnerability that violates data protection requirements. Policies encode security requirements designed to prevent or remediate vulnerabilities, and vulnerability detection involves evaluating architectural arrangements against applicable policies to identify non-compliant configurations that introduce security risks.

For example, a security architect reviewing a cloud-based microservices deployment would conventionally trace data flows between containers, verify that encryption settings are properly configured for each API endpoint, confirm that network segmentation policies isolate sensitive databases from public-facing load balancers, and validate that authentication protocols between identity providers and application services comply with organizational security standards. Certain architecture elements are particularly difficult to identify through manual review. These elements include complex dependencies such as circular service invocations, parallel processing pathways with race conditions, exception handling flows that bypass standard security controls, and hidden node metadata embedded within configuration files or container orchestration manifests that contain security-relevant parameters not visible in high-level architecture diagrams. Another deficiency of conventional approaches to security architecture review is the lack of mechanisms to dynamically assess compliance as artifacts, such as system architecture diagrams, are modified.

Conventional security architecture review processes are also hampered by organizational and procedural limitations. Insufficient security awareness among personnel, particularly new employees, often leads to the development of architectures that do not comply with organizational security policies from the outset. Security compliance is frequently treated as a secondary consideration and addressed after project initiation, resulting in significant rework following security assessments and revisions. Inadequate threat modeling can result in overlooked vulnerabilities and a lack of proactive risk mitigation in solution design. Insufficient documentation hampers effective knowledge transfer from developers to security teams, resulting in delays and inefficiencies during the solution approval process. The absence of a continuous review mechanism limits early detection of security gaps and hinders timely updates to align with evolving compliance requirements.

The aforementioned limitations result in increased security risks, extended review cycles, and inefficient allocation of security resources.

Implementations of the present technology provide several technical advantages over conventional security architecture review approaches. The present disclosure is directed to an artificial intelligence architecture analyzer (e.g., an architecture ingestion and decoder framework) that processes uploaded architecture artifacts to extract architectural components and their interconnections with reduced error rates and accelerated analysis compared to manual review processes. Additionally, the present disclosure is directed to an artificial intelligence vulnerability analyzer (e.g., a vulnerability framework) that enables proactive identification of security gaps and compliance violations with accelerated implementation of security measures compared to conventional manual security review processes. Additionally, the present disclosure is directed to an artificial intelligence architecture generator (e.g., an architecture regeneration framework) backed by compliance policies that enables faster restructuring and regeneration of system architectures to incorporate security controls and remediate identified vulnerabilities.

The security architecture review automation platform disclosed herein uses artificial intelligence models to identify architectural components and their interconnections from uploaded architecture artifacts. The artificial intelligence architecture analyzer (e.g., the architecture ingestion and decoder framework of FIG. 2A) includes the image processor agent, which performs image preprocessing operations including grayscale conversion to optimize the image for text and icon recognition. The image processor agent invokes a vision-language model to perform intelligent image analysis. The vision-language model identifies icons (e.g., graphical or other electronic representations of components) and their corresponding labels, recognizes connection patterns between services (including lines, arrows, and flow indicators), understands directional relationships and data flow patterns, and extracts service names (e.g., gateways, frameworks, APIs, databases) from text labels positioned near service icons. The image processor agent encodes the preprocessed image data into a format suitable for processing by neural networks. Digital images are inherently binary data, wherein each pixel is represented as one or more numerical values stored as binary digits. For grayscale images, each pixel is typically represented as an 8-bit unsigned integer (ranging from 0 to 255) indicating intensity. For color images, each pixel is represented using multiple channels (e.g., red, green, and blue channels in RGB format), with each channel stored as an 8-bit or higher bit-depth value. These pixel values are stored sequentially in memory as contiguous bytes, forming the raw binary representation of the image. Image file formats such as PNG or JPEG encode this pixel data along with metadata and optional compression into binary file structures. The image processor agent encodes this binary image data as base64, which is a representation of binary data as plain text using ASCII characters. Base64 encoding converts binary data (e.g., the bytes of a PNG or JPEG file) into a string of characters from a set of 64 symbols comprising uppercase letters A through Z, lowercase letters a through z, digits 0 through 9, plus sign, forward slash, and equals sign for padding. The architecture analyzer generates, as output, a structured representation of the architecture comprising identified clusters, services, connections, and directional flow indicators in a machine-readable format. This structured representation is suitable for downstream processing by the artificial intelligence vulnerability analyzer (e.g., the vulnerability framework of FIG. 2B) implemented by the policy application agent.

By transforming architecture diagrams into structured, machine-readable representations through these AI extraction and transformation operations, the platform enables systematic evaluation of system designs against security policies and compliance frameworks without requiring security professionals to manually parse visual elements, textual labels, and metadata. The platform implements a policy embedding search mechanism through the vulnerability analyzer implemented by the policy application agent. The policy application agent transforms extracted services and their interconnections into vector embeddings using an embedding model, and performs policy embedding search operations using vector similarity matching against a vector database in the analytics framework that stores a collection of security and compliance policies. The vulnerability analyzer invokes the AI framework with constructed prompts that include the extracted services, relationships, retrieved policies, and environment-specific instructions to perform compliance validation and vulnerability identification. The environment-specific instructions vary based on the deployment environment selected by the end user. In some implementations, the environment can be automatically detected—for example, by referencing user profile attributes, such as role information, permissions information, and the like. Production environments can permit sensitive data access and organizational intellectual property processing with public internet access via elastic IP addresses. User acceptance testing environments can prohibit sensitive data usage and organizational intellectual property with no public internet access. Development environments can permit broader service usage including any cloud service. Demonstration environments can have maximum lifetime constraints such as 90 days. Sandbox environments can permit local administrator accounts and public downloads of packages and utilities. This approach allows the platform to identify applicable security policies across multiple categories, including authentication and access control, data encryption, network security, monitoring and logging, backup and recovery, and container security, without requiring manual policy lookup or cross-referencing. The automated policy matching reduces the likelihood of overlooked compliance requirements and ensures consistent application of security standards across architecture reviews.

The platform provides automated vulnerability detection through the vulnerability analyzer implemented by the policy application agent. The vulnerability analyzer evaluates extracted architectural components against retrieved compliance policies using neural network-based analysis. The vulnerability analyzer identifies vulnerabilities by comparing the extracted architectural components against known vulnerability patterns and security policy requirements stored as embeddings in the vector database. Identified vulnerabilities can be stored as vector embeddings, enabling efficient similarity-based retrieval and comparison of vulnerability patterns across different architecture reviews. The vulnerability detection mechanism identifies security gaps such as missing encryption services, inadequate access control configurations, insufficient monitoring capabilities, and non-compliant network segmentation patterns. For example, the vulnerability analyzer can identify that an uploaded architecture lacks OAuth 2.0 federated authentication and advanced token-based authorization, and can recommend integrating OAuth 2.0 for federated identity management and secure token-based authentication. As another example, the vulnerability analyzer can identify missing security services such as Cloud DLP for data storage and processing services, CSPM and CWPP monitoring for compute, storage, and network services, and encryption services for data at rest and in transit.

The vulnerability analyzer generates, as output, a vulnerability report comprising three components: a component set identifying the architectural components analyzed, a vulnerability set comprising identified security vulnerabilities, and a policy set indicating the compliance policies against which the architecture was evaluated. The platform generates a remediation recommendation based on the vulnerability set, the component set, and the policy set. The remediation recommendation includes a remediation item specifying architectural changes to address identified vulnerabilities. By surfacing vulnerabilities during the design phase rather than after deployment, the platform enables proactive risk mitigation and reduces the cost and effort associated with post-deployment remediation. Additionally, the platform generates security-enhanced architecture diagrams through the artificial intelligence architecture generator (e.g., the architecture regeneration framework of FIG. 2C) implemented by the diagram generator agent. The diagram generator agent automatically embeds security components into the original architecture design based on identified vulnerabilities and applicable compliance policies.

The architecture generator produces domain-specific language code that, when executed, renders visual architecture representations incorporating recommended security services such as web application firewalls, encryption key management services, identity and access management services, audit logging services, and network firewalls. This automated architecture regeneration capability accelerates the process of restructuring system designs to achieve compliance, thereby reducing the manual effort required to translate security recommendations into actionable architectural modifications.

The security architecture review automation platform reduces architecture review effort by approximately 75% and reduces processing time from approximately 4 days to approximately 1 day, while ensuring security compliance backed architecture review processes. For example, the platform enables processing of approximately 500 architecture scans per year compared to approximately 100 with manual methods, with each architecture review taking less than 1 day compared to 4 days manually.

As used herein, the term "component" and like terms (e.g., "system", "unit", "compute resource", "service") refer to a set of physical or logical compute resources, such as device, memory, processor, or unit of computer-executable code configured to cause a computing system to perform operations.

As used herein, the term "entity" and like terms (e.g., "layer", which can be a set of entities structured to perform a function) refer to a functional unit that performs operations, such as application delivery, application state management, data access, data caching, interfacing with other entities, service delivery, data persistence management, data storage, and so forth. Entities can use, include or implement a portion of a compute resource, a particular one of a compute resource, or more than one compute resources.

As used herein, the terms "engine", "logic", "module", "executable", "framework", "assembly" and like terms refer to hardware, firmware, software, and/or combinations thereof, including particularly configured devices structured to perform operations such as the operations described herein in any suitable combination. Engines can use, include or implement a portion of, one, or more than one compute resources, such as processor and memory. In some instances, engines can use, include or implement agentic functionality. That is, engines or portions thereof can take the form of computer-based agents capable of autonomously or semi-autonomously performing computer-based tasks.

As used herein, the term "user-interactive framework" and like terms refer to frameworks (e.g., component sets, software modules, or integrated systems) that include user-interactive interfaces configured to receive user input and provide responsive output. User-interactive interfaces can include graphical user interfaces (GUIs) rendered on display devices, voice interfaces that process spoken commands and generate audible responses, chatbots that engage in natural language conversations, command-line interfaces, touch-based interfaces, gesture-recognition interfaces, and hybrid interfaces that combine multiple interaction modalities. User-interactive frameworks can facilitate operations such as data entry, navigation, visualization, configuration, feedback collection, and real-time collaboration between users and computing systems.

As used herein, the term "node collection", "graph" and like terms refer to a data structure comprising a set of items (nodes), wherein each node can be associated with metadata, attributes, properties, labels, or other descriptive information. Nodes in the set of nodes can be relationally linked via relationships, edges, paths, dependencies, hierarchies, or rules (e.g., policy rules, security constraints, compliance requirements). Node collections can represent system architectures, network topologies, data flows, component dependencies, access control structures, or other interconnected elements. Relationships between nodes can be directional or bidirectional, weighted or unweighted, and can encode semantic information such as data flow direction, trust boundaries, authentication requirements, or communication protocols. Node collections can be traversed, queried, analyzed, and transformed to identify patterns, detect anomalies, evaluate compliance, or generate modified configurations.

As used herein, the term "agent" refers to entities that interact with their environment, process information, and/or take actions to achieve specific goals or objectives, such as the goals or objectives determined based on user input and/or inferred from the environment. An agent can be thought of as a combination of software, firmware and/or hardware components that encompass characteristics (e.g., traits, attributes, properties, and/or knowledge), states (e.g., user question or its derivatives, agent feedback), and/or agent interaction rules that govern its behavior and communication with other agents. The agent interaction rules can include references to models (e.g., artificial intelligence/machine learning (AI/ML) models, such as neural networks) that define agents' decision-making processes and behaviors. Instantiating (spawning) an agent refers to the process of creating a new instance of an agent entity, class or object, which can involve allocating memory for the agent's data structures and variables, initializing agent attributes, setting up agent communication channels, and activating agent reasoning and decision-making mechanisms. This process can be compared to creating a new thread or process in a computer program, where the instantiated agent operates as a separate entity, executing autonomously and interacting with its environment and other agents. Depending on the implementation, agents can take various forms, such as executables running on physical and/or virtual machines and/or robotic agents interacting with physical environments. In some cases, agents can be instantiated as containerized applications, leveraging technologies like Docker, or as serverless functions, utilizing platforms like AWS Lambda. Additionally, agents can be implemented using various programming paradigms, including object-oriented, functional, or logic-based programming, and can be designed to operate in diverse domains, such as e-commerce, healthcare, finance, or transportation.

Agents can use physical or virtualized resources (e.g., processors, memory, cache, communication interfaces, devices, databases, servers, components of the AI/ML stack) in any suitable combination. Particular ones of such resources can be statically allocated or dynamically allocated at runtime (e.g., to a particular agent or group of agents for a duration of a simulation session or a set of simulation sessions). Particular ones of such resources can be dedicated, shared among agents, or shared between an agent and other processes. Various components of agents (e.g., models, data stores, executables, processors) can be implemented across resources in a distributed manner. Accordingly, unless otherwise indicated by context or expressly noted, the terms "local" (as in "local agent") and "node" (as in "agent node") should not be automatically assumed to refer to a particular unitary physical resource. Agents can generate and/or execute queries, including database queries, API calls, and system-level data requests, to inform their decision-making processes or generate outputs. System-level data requests involve the execution of compiled instructions, such as native code or bytecode, to access low-level system resources, invoke system calls, or perform other operations requiring direct hardware or software interaction. This can include executing shell commands or scripts, accessing system logs or event streams, invoking system APIs or device drivers, and performing system-level monitoring or profiling. By executing these queries, agents can access relevant data from various sources, reason about their environment, and produce more accurate and context-dependent outputs.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Security Architecture Review Automation Platform

FIG. 1A is a block diagram that illustrates a security architecture review automation platform 100 that can implement aspects of the present technology. The security architecture review automation platform 100 is an artificial intelligence chat-based platform designed to automate and optimize critical steps in the development lifecycle. The platform 100 implements usage credit allocation through a role-based credit allocation system to regulate solution usage, ensuring responsible access and preventing misuse or overconsumption of compute, storage, and artificial intelligence resources. The platform 100 can also perform architecture ingestion and service mapping by allowing users to upload preliminary architecture artifacts, such as images or textual transcripts, and automatically extracts the underlying services, components, and their interconnections for downstream analysis. The platform 100 can also maintain a governance policy archive comprising a centralized record of organizational security and compliance policies to support architecture redesign and ensure alignment with regulatory standards. The platform 100 can also perform vulnerability analysis and remediation guidance by evaluating the extracted services and connections against defined security and compliance policies to identify potential vulnerabilities and recommending optimal modifications to the initial architecture to mitigate identified risks. The platform 100 can also provide an interactive chat with real-time feedback that enables human-in-the-loop feedback on identified vulnerabilities and compliance gaps, ensuring the final architecture is refined through both artificial intelligence-driven insights and expert human judgment. The platform 100 can also perform architecture regeneration by regenerating architectural visualization incorporating insights from identified vulnerabilities and compliance gaps. The platform 100 can also capture and manage user activity logs for audit and monitoring through an audit trail and oversight mechanism. The platform 100 can also finalized architectures to a downstream platform (e.g., a security operations platform) for final review by forwarding architecture, chat history, and analysis results to a security operations team via a security operations platform for final validation and approval.

As shown, in FIG. 1A, end users 113*a* (e.g., system designers, system architects, security architects, developers) can utilize the user computing device 102 to access the security architecture review automation platform 100. The security architecture review automation platform 100 can be implemented as a desktop application, web-based application, mobile application, or a combination thereof, and can authenticate end users 113*a* by verifying user credentials against a suitable user directory, such as active directory. In some implementations, the security architecture review automation platform 100 can authenticate end users 113*a* using tokens, keys, or other cryptographic entities provided by end users 113 and accessible to the security architecture review automation platform 100 via a key vault, a token vault, or another suitable mechanism (e.g., via a single sign-on framework 112). The authentication operations can include validating bearer tokens issued by an identity provider, retrieving user context information (e.g., user identifier, role, department, location), and establishing a secure session for subsequent operations. The authentication operations can verify token integrity and authenticity before enabling the end user 113*a* to proceed with architecture review tasks.

End users 113*a* can interact with the security architecture review automation platform 100 via a front-end framework 110, which can generate and render and provide, via a graphical user interface (GUI) on a display of the user computing device 102, an interactive chat session 104. The interactive chat session 104 can provide a conversational interface through which end users 113*a* can submit architecture artifacts, receive analysis results, provide feedback, and interact with the security architecture review automation platform 100 using natural language inputs. The interactive chat session 104 can maintain conversation history, display vulnerability reports, present remediation recommendations, and enable users to accept, modify, or regenerate outputs generated by the platform 100. The interactive chat session 104 can support rich formatting, image display with zoom capabilities, and markdown-to-HTML conversion for presenting structured analysis results. The interactive chat session 104 can implement auto-scroll functionality to display the latest messages and can persist message history for session recovery purposes.

In some implementations, the front-end framework 110 can include a security architecture review agent interface 114, a chat interface 116, and a security operations ticket generator 118. The security architecture review agent interface 114 can provide a dashboard through which end users 113*a* can upload architecture artifacts, monitor processing status, view credit balances, and access generated outputs. The security architecture review agent interface 114 can display agent status indicators, provide history viewing functionality for accessing past sessions with associated metadata, and enable download or deletion of previous analysis outputs.

The chat interface 116 can include configuration options for specifying file types (e.g., text or image), target deployment environments (e.g., development, user acceptance testing, production, demonstration, sandbox), and architecture complexity levels (e.g., high-level abstract or low-level detailed). The configuration options can be implemented through various user interface controls, including dropdown menus for selecting file types from predefined options, radio buttons for selecting mutually exclusive deployment environments, and slider controls for specifying architecture complexity levels along a continuous scale. Numerical range inputs can enable end users 113*a* to specify parameters such as maximum token limits for analysis outputs or confidence thresholds for vulnerability detection. In some implementations, the chat interface 116 can generate configuration tokens based on user instructions using natural language processing, wherein end users 113*a* can provide free-form text descriptions of their configuration preferences and the platform 100 can parse the natural language input to extract configuration parameters and populate corresponding configuration fields automatically.

The chat interface 116 can validate file types (e.g., those of input artifacts) and sizes (e.g., apply a maximum size threshold to input artifacts), construct data payloads with configuration values, and transmit architecture artifacts to the back-end framework 120 for processing.

The security operations ticket generator 118 can prompt end users 113*a* to provide additional details including contact information, project name, project objective, department, and technology domain when forwarding finalized architectures for security operations review. The front-end framework 110 can be communicatively coupled to the back-end framework 120, which can include a security architecture review agent framework 122 and a security operations application programming interface (API) 124. The security operations API 124 can enable integration with external security operations management systems for ticket creation, workflow tracking, and remediation task assignment. The security operations API 124 can transmit ticket payloads including modified architecture diagrams, chat history documentation, original input artifacts, relevant transcripts, and policy documentation to external security operations platforms.

The security architecture review agent interface 114 can be communicatively coupled to the security architecture review agent framework 122 via a suitable application development platform, application deployment platform, or the like (e.g., containerized deployment environments).

The security architecture review agent framework 122 can implement a multi-agent orchestrator that coordinates tasks across specialized agents, including an image processing agent for decoding diagrams and mapping connections, a policy application agent for embedding policies and performing compliance checks, and a diagram generation agent for domain-specific language code generation and rendering. The multi-agent orchestrator can handle thread management, state management, and task coordination across the specialized agents.

The security architecture review agent framework 122 can be configured to access a developer environment 140 associated with a developer 113*b*. The developer 113*b* can cause build agents 144 to generate computer-executable code, configuration files, or libraries using the output generated by the security architecture review agent framework 122. The build agents 144 can generate infrastructure-as-code artifacts (e.g., provisioning scripts, deployment configurations) that embed security policies and compliance requirements directly into deployable infrastructure definitions. The build agents 144 can transform visual architecture diagrams into executable infrastructure code by leveraging context-aware code synthesis with compliance-embedded generation.

The back-end framework 120 can be communicatively coupled to data stores, including a structured data store 134 and an object data store 136. The structured data store 134 can be implemented as a relational database or key-value store configured to maintain task state, user metadata, and workflow records. The structured data store 134 can maintain task records comprising unique task identifiers, timestamps, processing status indicators, and metadata for audit tracking purposes. Processing status indicators can include workflow generated, code generated, review passed, and completed states. The structured data store 134 can store user management data including task identifiers, employee identifiers, sanitized input file names, hexadecimal codes of input images, and employee names for logging and management purposes. The object data store 136 can be implemented as a distributed file storage system configured to store architecture artifacts, input node collections, generated diagrams, dynamically generated node collections, and intermediate processing outputs. The object data store 136 can store input artifacts and output artifacts in structured directories organized by user identifier and task identifier. Input artifacts can include original architecture images and grayscale processed images. Output artifacts can include chat history records, domain-specific language code files, generated architecture diagrams, state files, and compliance documentation. The object data store 136 can support automatic synchronization operations that upload local artifacts to cloud storage with folder structures mirroring local directories for backup and cross-system access.

The back-end framework 120 can be communicatively coupled to additional components, such as the analytics framework 130 (e.g., a search and analytics engine for policy retrieval and compliance matching) and AI framework 132 (e.g., a large language model, or more generally, a neural network service for architecture analysis, vulnerability detection, and code generation).

The analytics framework 130 can implement a vector database that stores a collection of security and compliance policies, enabling policy embedding search operations using vector similarity matching to retrieve relevant compliance policies. The analytics framework 130 can transform extracted services and their interconnections into vector embeddings, which can be compared against embeddings in the vector database to identify the most relevant policies across categories including authentication and access control, data encryption, network security, monitoring and logging, backup and recovery, and container security.

The AI framework 132 can provide vision capabilities for analyzing architecture diagrams, including identifying cloud service icons and their corresponding labels, recognizing connection patterns between services, understanding directional relationships and data flow patterns, and extracting service names from text labels. The AI framework 132 can generate domain-specific language (DSL) code by parsing existing code structure, identifying missing services, embedding security components (e.g., web application firewalls, encryption key management services, identity and access management services, audit logging services, monitoring services, network firewalls, virtual private network endpoints), creating inter-service connections, and organizing services into logical clusters. The AI framework 132 can perform sentiment analysis on user feedback to determine subsequent workflow steps, comprehending user intent to determine whether to proceed with current suggestions or modify portions according to user feedback.

In an example use case, at 1101, the end user **113*a* can access the security architecture review agent interface 114 via a dashboard rendered on the user computing device 102. The platform 100 can perform authentication and authorization operations, including validating access tokens issued by an identity provider, retrieving user context information (e.g., user identifier, role, department, location), and establishing a secure session for subsequent operations. The authentication operations can verify token integrity and authenticity before enabling the end user 113*a*** to proceed with architecture review tasks.

At 1102, the platform 100 can perform pre-processing and setup operations involving the end user **113*a*, the chat interface 116, and the interactive chat session 104. The platform 100 can verify user credits available for processing operations, perform image pre-processing on uploaded architecture artifacts (e.g., converting images to grayscale for optimized analysis), upload original and processed artifacts to the object data store 136, and create task records in the structured data store 134** with unique task identifiers and timestamps. The task records can be used to manage state information.

At 1103, the front-end framework 110 and the back-end framework 120 can exchange information to facilitate archive recovery operations. The security architecture review agent interface 114 can communicate with the security architecture review agent framework 122 to retrieve artifacts from previous processing tasks, including prior analysis outputs, chat history records, domain-specific language code files, and generated diagrams. The security operations ticket generator 118 can communicate with the security operations API 124 to synchronize ticket status and remediation tracking information.

At 1104, the security architecture review agent interface 114 can coordinate image processing operations through the security architecture review agent framework 122. An image processing agent can convert input architecture diagrams into encoded formats for transmission to the AI framework 132, perform visual analysis to detect textual and graphical elements, classify service types and extract service names from the diagram, conduct visual flow analysis to identify relationships between components, detect directional edges and validate logical connections, and generate a structured representation of the architecture including identified clusters, services, and connections.

At 1105, the security architecture review agent framework 122 can return extracted architecture data to the security architecture review agent interface 114. The returned data can include initial diagram generation outputs, wherein the platform 100 transforms extracted service and connection data into a structured visual representation using domain-specific language code. The platform 100 can normalize detected services by resolving missing class definitions, generate import statements for identified components, organize services into functional clusters, and define directional connections between services.

At 1106, the back-end framework 120 can exchange data with the analytics framework 130, which in turn exchanges data with the AI framework 132. A policy application agent can analyze service relationships to understand operational dependencies, define security boundaries across clusters and components, and create a logical sequence of workflow steps. The analytics framework 130 can perform policy embedding search operations using vector similarity matching to retrieve relevant compliance policies from a policy database, including policies related to authentication and access control, data encryption, network security, monitoring and logging, backup and recovery, and container security.

At 1107, the back-end framework 120 can exchange data with the AI framework 132 in an iterative processing loop involving the back-end framework 120, the AI framework 132, and the analytics framework 130. The AI framework 132 can generate enhanced domain-specific language code by parsing existing code structure, identifying missing services, embedding security components (e.g., web application firewalls, encryption key management services, identity and access management services, audit logging services, monitoring services, network firewalls, virtual private network endpoints), creating inter-service connections, and organizing services into logical clusters. The analytics framework 130 can provide policy context and compliance requirements to inform the AI framework 132 during code generation. This iterative loop can continue until the generated architecture satisfies security and compliance criteria.

At 1108, the back-end framework 120 can perform state management operations with the object data store 136. The platform 100 can remove outdated artifacts, upload updated workflow definitions, policy mappings, and intermediate domain-specific language code, and store final artifacts including generated architecture diagrams and documentation files.

At 1109, the back-end framework 120 can perform state management operations with the structured data store 134. The platform 100 can update task records with processing status indicators (e.g., workflow generated, code generated, review passed, completed), timestamps, and metadata for audit tracking purposes.

At 1110, the back-end framework 120 can exchange data with the developer environment 140. The security architecture review agent framework 122 can provide generated outputs to the developer environment 140, including security-enhanced architecture diagrams, domain-specific language code, compliance documentation, and environment-specific instructions. The build agents 144 can utilize these outputs to generate infrastructure-as-code artifacts (e.g., provisioning scripts, deployment configurations) that embed security policies and compliance requirements directly into deployable infrastructure definitions. The platform 100 can also generate security operations tickets via the security operations API 124, attaching architecture diagrams, chat history documentation, and policy documentation for security operations review and remediation tracking.

In some implementations, the platform 100 can perform user validation operations through the interactive chat session 104. The platform 100 can present the generated workflow summary and diagram preview to the end user 113*a* for review and confirmation. The end user 113*a* can provide validation input indicating acceptance or modification of the generated outputs. When the end user 113*a* indicates acceptance, the platform 100 can proceed to finalization operations. When the end user 113*a* indicates modification, the platform 100 can capture the modification request, process the feedback through the AI framework 132, and regenerate the affected outputs based on the user-provided feedback. The validation operations can implement a human-in-the-loop design that combines AI-driven automation with human judgment and oversight throughout the architecture review process.

In some implementations, the platform 100 can perform diagram rendering and quality assurance operations. A diagram generator agent can execute the generated domain-specific language code to render a visual architecture diagram. When execution errors occur due to missing class definitions or service mappings, the platform 100 can perform normalization operations to resolve missing services, update import statements, and regenerate the domain-specific language code. A review agent can perform quality assurance checks on the generated code, including verifying that all services are included, security services are present, connections are valid, no orphan nodes exist, proper cluster organization is maintained, code syntax is correct, and best practices are followed. When the review agent identifies issues, the platform 100 can regenerate the code with applied corrections and perform subsequent review iterations until the generated architecture satisfies quality criteria.

In some implementations, the platform 100 can generate compliance context documentation through the AI framework 132. The platform 100 can produce documentation outputs including an architecture overview describing high-level design and service interactions, security rationale providing justification for applied security measures, compliance mappings indicating alignment with regulatory frameworks (e.g., SOC 2, GDPR, HIPAA), and best practice recommendations for scalability, resilience, and governance. The compliance context documentation can provide a transparent and auditable record of architectural decisions for stakeholders.

In some implementations, the platform 100 can perform finalization operations. The platform 100 can remove temporary artifacts from the object data store 136, generate final documentation files including chat history records in portable document format, update task records in the structured data store 134 with completion status and finalization timestamps, and deliver final artifacts to the end user 113*a* through the interactive chat session 104. The finalization operations can ensure proper cleanup, state consistency, and delivery of a comprehensive artifact package for review and archival.

In some implementations, the platform 100 can perform security operations integration operations. When the end user 113*a* elects to forward the finalized architecture for security operations review, the platform 100 can prompt the end user 113*a* to provide additional details including contact information, project name, project objective, department, and technology domain. The security operations ticket generator 118 can communicate with the security operations API 124 to create a ticket in an external security operations management system (e.g., ServiceNow). The ticket payload can include the modified architecture diagram, chat history documentation, original input artifacts, relevant transcripts, and policy documentation. The security operations integration can enable the security operations team to perform final validation and approval of the generated architecture.

Modules of the Security Architecture review Automation Platform

Figure 1B:
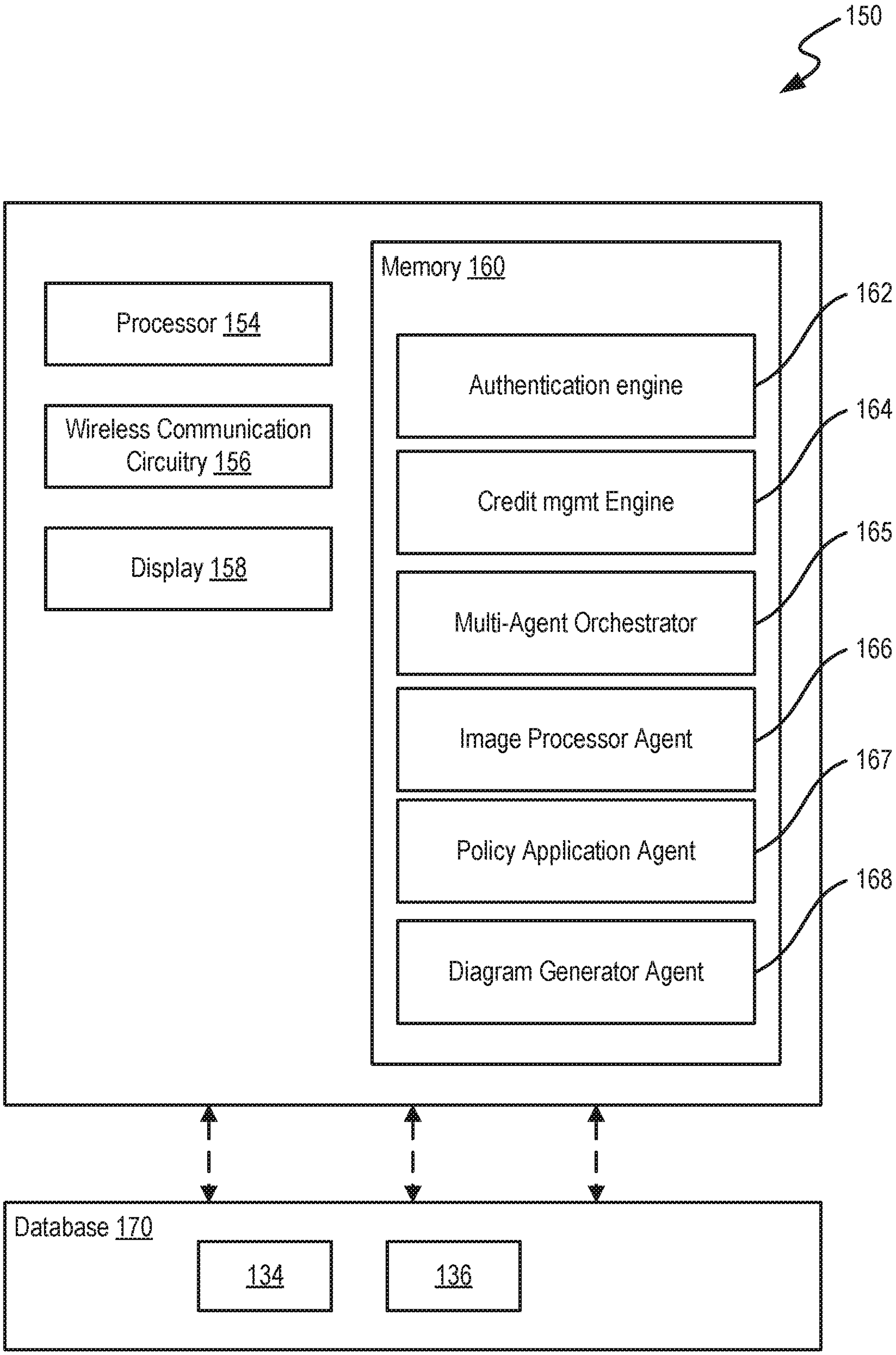
FIG. 1B illustrates physical and logical components of the security architecture review automation platform, in accordance with some implementations of the present technology.

FIG. 1B illustrates physical and logical components of the security architecture review automation platform 100 of FIG. 1A, in accordance with some implementations of the present technology. As shown, an example security architecture review automation platform 100 can be a computing system, which can include a computing server or a set of computing servers, defined as physical or logical compute entities configured to perform operations described herein, including authentication operations, credit management operations, multi-agent orchestration operations, image processing operations, policy application operations, and/or diagram generation operations.

An example computing server of the security architecture review automation platform 100 can include a processor 154 (such as x86, ARM, or RISC-V architectures, including multi-core processors or specialized processors like GPUs or TPUs), a memory 160 (including RAM types such as DDR4, DDR5, or high-bandwidth memory, and storage types such as SSDs, NVMe drives, or traditional hard drives), a wireless communication circuitry 156 (supporting protocols such as Wi-Fi 6, Bluetooth 5.0, cellular networks, or Ethernet connections) to establish wireless communication and/or information channels (e.g., Wi-Fi, internet, APIs, communication standards) with other computing devices and/or services (e.g., servers, databases, cloud infrastructure), and a display 158 (e.g., user interface) (such as LCD, OLED, or e-ink displays, or headless configurations for server deployments). The processor 154 can have generic characteristics similar to general-purpose processors, or the processor 154 can be an application-specific integrated circuit (ASIC) that provides arithmetic and control functions to security architecture review automation platform 100. While not shown, the processor 154 can include a dedicated cache memory (such as L1, L2, or L3 caches with varying sizes and associativity). The processor 154 can be coupled to components of the security architecture review automation platform 100, directly or indirectly, for data communication.

Figure 4:
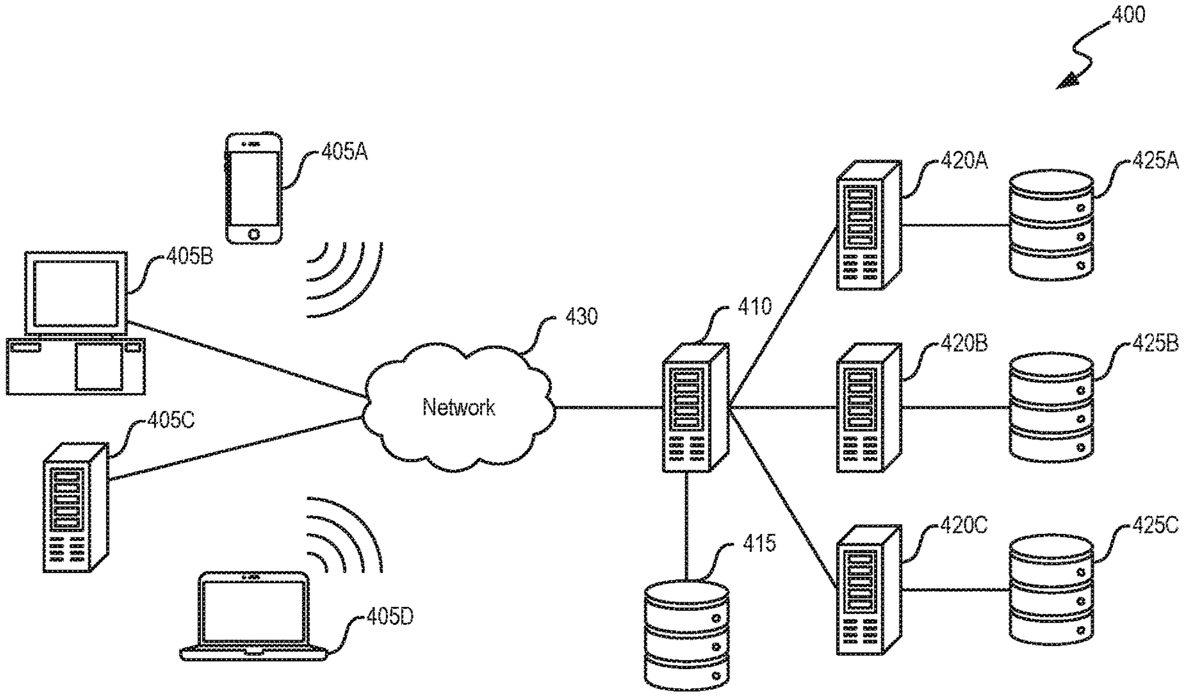
FIG. 4 is a system diagram illustrating an example of a computing environment in which the security architecture review automation platform operates in some implementations.

Further, the processor 154 can be communicatively coupled to a computing database 170 that can be hosted core network 406 described in reference to FIG. 4. The computing database 170 can include data stores configured to store session objects and metadata, credit data, connectivity data, framework data, user objects and metadata, input artifacts, output artifacts, node collections, vulnerability data, component data, policy data, remediation data, agent definitions, chat history, ontologies, variable descriptions, embeddings, vectors, indexes, training information (inputs, outputs, validation information such as scores), thresholds, and the like. The data stores can be implemented as relational databases, such as MySQL or PostgreSQL (or other RDBMS such as Oracle, SQL Server, or SQLite) (e.g., to support storage of structured data and complex transactions); NoSQL databases such as MongoDB or Cassandra (or other NoSQL systems such as CouchDB, DynamoDB, or Redis) (e.g., to handle large amounts of unstructured or semi-structured data and offer flexible schema designs); graph databases such as Neo4j (or other graph databases such as Amazon Neptune, ArangoDB, or TigerGraph) (e.g., to support storing and querying complex relationships between data entities), and/or distributed file systems such as HDFS (or other distributed storage systems such as Amazon S3, Google Cloud Storage, or Azure Blob Storage) (e.g., to support storing large files and handling big data workloads). Additionally, data stores can include key-value pairs (using systems such as Redis, DynamoDB, or Riak), XML files (with parsers such as Ixml, ElementTree, or SAX), addressable memory stores (such as in-memory databases like SAP HANA or VoltDB), metadata stores (such as Apache Atlas or DataHub), vector stores (such as Pinecone, Weaviate, or Chroma), indexes/indexed data (using indexing technologies such as Elasticsearch, Solr, or database-specific indexes), or other similar data structures. In some implementations, the data files can include data warehouse computing systems and/or integration frameworks therefor, such as Apache Hive, Amazon Redshift, Google BigQuery, or Snowflake (or other data warehouse solutions such as Dynamo DB, Azure Synapse, Databricks, or Teradata). In some implementations, the data stores can include AI/ML models and/or frameworks therefor, such as those described in connection with FIG. 5.

The memory 160 can include any suitable type of storage device including, for example, a static random-access memory (SRAM), dynamic random-access memory (DRAM) (including variants such as DDR4, DDR5, or LPDDR), electrically erasable programmable read-only memory (EEPROM), flash memory (including NAND flash, NOR flash, or 3D NAND), latches, and/or registers. In addition to storing instructions that can be executed by the processor 154, the memory 160 can also store data generated by the processor 154 (e.g., when executing the modules of the platform 100). In additional or alternative embodiments, the processor 154 can store temporary information onto the memory 160 and store long-term data onto the computing databases 170. The memory 160 is merely an abstract representation of a storage environment. Hence, in some embodiments, the memory 160 comprises one or more actual memory chips or modules (such as DIMMs, SO-DIMMs, or embedded memory modules).

Modules of the memory 160 can include an authentication engine 152, a credit management engine 164, a multi-agent orchestrator 165, an image processor agent 166, a policy application agent 167, and a diagram generator agent 168. These engines can be disposed or executable, in whole or in part, on more than one computing system, such as a distributed computing system (using frameworks such as Apache Spark, Kubernetes, or Docker Swarm) or client/server computing system (implemented using architectures such as REST APIs, microservices, or traditional three-tier architectures). More generally, implementations of the security architecture review automation platform 100 can include additional, fewer, or different modules, or distribute functionality differently between the modules. Accordingly, the engines could each comprise software, firmware, and/or hardware components implemented in, or accessible to, the security architecture review automation platform 100.

The authentication engine 152 can perform authentication and authorization operations for end users accessing the security architecture review automation platform 100. The authentication engine 152 can use role-based access control and bearer token authentication to authorize usage. The authentication engine 152 can validate bearer tokens issued by an identity provider, retrieve user context information (e.g., user identifier, role, department, location), and establish secure sessions for subsequent operations. The authentication engine 152 can verify token integrity and authenticity before enabling end users to proceed with architecture review tasks. In some implementations, the authentication engine 152 can interface with a single sign-on framework to authenticate end users using tokens, keys, or other cryptographic entities accessible via a key vault, a token vault, or another suitable mechanism. The authentication engine 152 can confirm the target environment (e.g., development, user acceptance testing, production, demonstration, sandbox) and validate the token for integrity and authenticity before establishing a secure session.

The credit management engine 164 can implement a role-based credit allocation system to regulate solution usage, ensuring responsible access and preventing misuse or overconsumption of compute, storage, and artificial intelligence resources. The credit management engine 164 can verify whether an end user has sufficient credits to initiate an architecture review session, wherein each session consumes a predetermined number of credits. The credit management engine 164 can validate usage eligibility by querying a credit data store, returning the end user's remaining credit balance and confirming whether the end user is authorized to initiate the current session. The credit management engine 164 can deduct credits based on usage and can interface with administrative functions for managing credit balances. In some implementations, the credit management engine 164 can disable actions within the user-interactive framework when the end user's credit balance reaches zero, and can prompt end users to request additional credits when insufficient credits are available for processing operations.

The multi-agent orchestrator 165 can coordinate tasks across specialized agents within the security architecture review agent framework 122. The multi-agent orchestrator 165 can handle thread management, state management, and task coordination across the specialized agents, including the image processor agent 166, the policy application agent 167, and the diagram generator agent 168. The multi-agent orchestrator 165 can maintain a state management model that tracks processes, inputs, outputs, and errors throughout the architecture review workflow. The state management model can include workflow identifiers for tracking and logging, workflow progression indicators, active function execution trackers, user intent and input fields, validation decisions for workflow progression, conversation history preservation, content processing and analysis fields, code generation and validation fields, security and compliance fields, system management and persistence fields, and error handling and communication fields. The multi-agent orchestrator 165 can determine the next step in the workflow using state management, handling current steps including process extraction, process validation, domain-specific language code generation, and diagram rendering. The multi-agent orchestrator 165 can capture user input, conversation history, and validation decisions with real-time updates to chat history and user choice tracking.

The image processor agent 166 can implement an artificial intelligence architecture analyzer that processes uploaded architecture artifacts to extract architectural information from system design diagrams with reduced error rates compared to manual analysis. The image processor agent 166 can receive, as input, architecture diagram image files in various formats and can perform image preprocessing operations including grayscale conversion to optimize the image for text and icon recognition. The image processor agent 166 can encode the preprocessed image into a base64 format for transmission to a vision-language model, such as a multimodal neural network with vision capabilities.

Figure 5:
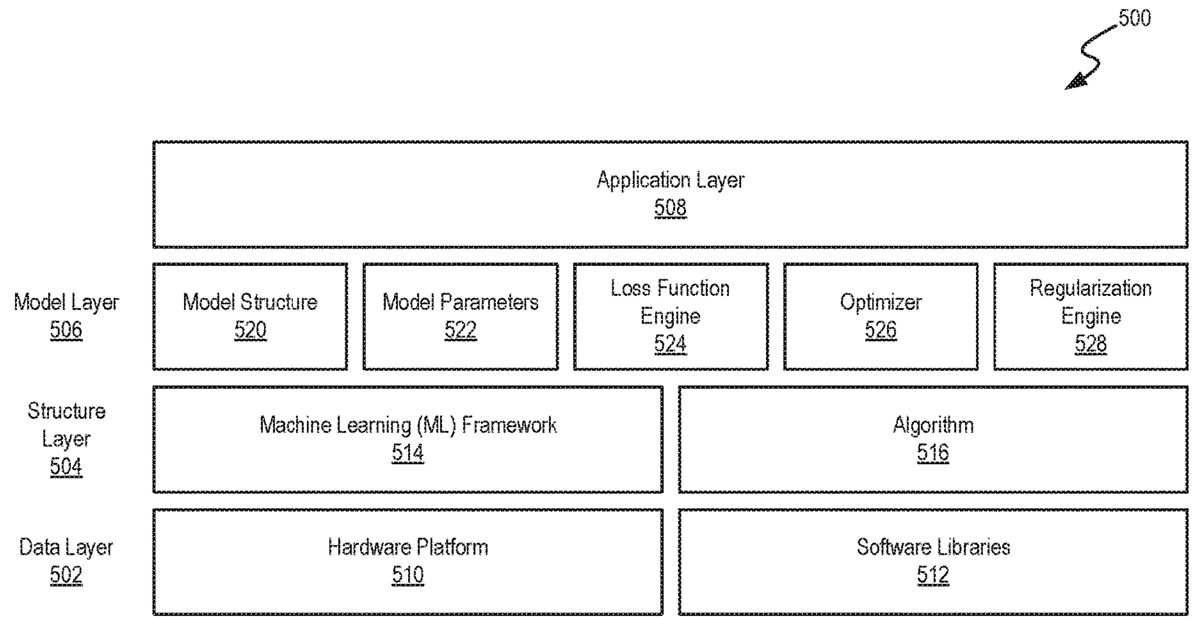
FIG. 5 illustrates a layered architecture of an artificial intelligence (AI) system that can implement the artificial intelligence/machine learning (AI/ML) models of the security architecture review automation platform in accordance with some implementations of the present technology.

The vision-language model can be implemented using the AI system 500 described in reference to FIG. 5, wherein the model structure 520 can comprise a transformer-based architecture with vision encoder components and language decoder components. The vision-language model can be trained using the algorithm 516 with supervised learning techniques on labeled datasets comprising architecture diagrams annotated with service identifications, connection mappings, and directional relationships. The model parameters 522 can be optimized using the optimizer 526 to minimize a loss function computed by the loss function engine 524, wherein the loss function can measure differences between predicted architectural element identifications and ground truth annotations. Model variants suitable for the vision-language model can include multimodal transformers such as vision transformers (ViT) combined with language model decoders, contrastive language-image pretraining (CLIP) architectures, and encoder-decoder architectures with cross-attention mechanisms between visual and textual representations.

The image processor agent 166 can invoke the vision-language model with prompt-based instructions that direct the model to focus on architectural elements while ignoring extraneous visual information, wherein the prompting strategy emphasizes extraction of service names, connection mappings, and directional relationships while maintaining accuracy in representing the original diagram's intent. The vision-language model can perform intelligent image analysis to identify service icons and their corresponding labels, recognize connection patterns between services including lines, arrows, and flow indicators, understand directional relationships and data flow patterns, and extract service names from text labels positioned near service icons. The image processor agent 166 can generate, as output, a structured representation of the architecture comprising identified clusters, services, connections, and directional flow indicators in a machine-readable format suitable for downstream processing by the policy application agent 167. The image processor agent 166 can maintain application state by updating a state object with processing status, intermediate results, and error conditions, and can implement exception handling to capture processing failures, artificial intelligence service errors, or file access issues.

For efficient memory utilization, the image processor agent 166 can process previously stored (archived) diagrams, node collections, or components thereof, such that partial artifact sets can be updated or generated.

In an example use case, an end user can specify a portion of an architecture artifact on which to apply archived data for analysis and regeneration operations. The end user can interact with the chat interface 116 to designate specific clusters, services, or connection subsets within an uploaded architecture diagram that should use previously processed data rather than undergoing full reprocessing. For instance, when an end user uploads a modified architecture diagram that includes both unchanged components and newly added services, the end user can indicate through natural language input or selection controls that the unchanged components should utilize archived analysis results while the newly added services should undergo fresh extraction and vulnerability analysis. The image processor agent 166 can parse the user specification to identify the designated portion, retrieve corresponding archived data, and selectively process only the portions requiring new analysis.

Archived data can comprise data cached within the current session or data stored from a previous session. Session-cached archived data refers to intermediate processing results, extracted node collections, vulnerability assessments, and generated domain-specific language code that are retained in volatile memory or temporary storage during an active architecture review session. Session-cached data enables rapid iteration when an end user makes incremental modifications to an architecture and requests reanalysis without requiring complete reprocessing of unchanged components. Previously-stored archived data refers to processing artifacts persisted to the object data store 136 upon session completion or at designated checkpoints, including extracted service mappings, vulnerability reports, compliance assessments, and generated architecture diagrams associated with prior task identifiers. The image processor agent 166 can retrieve previously-stored archived data by querying the object data store 136 using user identifiers and task identifiers, enabling end users to resume analysis from prior sessions or to apply historical analysis results to current architecture review workflows. The multi-agent orchestrator 165 can coordinate the selective application of archived data by maintaining mappings between architectural component identifiers and their corresponding archived analysis states, enabling efficient hybrid processing that combines archived results for stable components with fresh analysis for modified or newly introduced components.

The policy application agent 167 can implement an artificial intelligence vulnerability analyzer that enables proactive security measures with accelerated implementation compared to manual security review processes. The policy application agent 167 can receive, as input, the structured representation of the architecture generated by the image processor agent 166, including extracted services and their interconnections. The policy application agent 167 can transform the extracted services and their interconnections into vector embeddings using an embedding model, and can perform policy embedding search operations using vector similarity matching against a vector database storing a collection of security and compliance policies.

The embedding model can be implemented using the AI system 500 described in reference to FIG. 5, wherein the model structure 520 can comprise encoder-based transformer architectures optimized for generating dense vector representations. The embedding model can be trained using the algorithm 516 with contrastive learning techniques or masked language modeling objectives to learn semantic representations of security policies and architectural components. Model variants suitable for the embedding model can include sentence transformers, bidirectional encoder representations from transformers (BERT) variants, and domain-specific embedding models fine-tuned on security and compliance corpora. The model parameters 522 can be fine-tuned using the optimizer 526 with domain-specific training data to improve retrieval accuracy for security policy matching.

The vector similarity matching can retrieve relevant compliance policies across categories including authentication and access control, data encryption, network security, monitoring and logging, backup and recovery, and container security. The policy application agent 167 can invoke a neural network with constructed prompts that include the extracted services, relationships, retrieved policies, and environment-specific instructions to perform compliance validation and vulnerability identification. The neural network can be implemented using the AI system 500 described in reference to FIG. 5, wherein the model structure 520 can comprise decoder-only transformer architectures with self-attention mechanisms as described in reference to FIG. 6. Model variants suitable for the neural network can include generative pre-trained transformer (GPT) architectures, instruction-tuned language models, and reinforcement learning from human feedback (RLHF) fine-tuned models optimized for following complex instructions and generating structured outputs.

The environment-specific instructions can vary based on the deployment environment selected by the end user, wherein production environments can permit sensitive data access and public internet access, user acceptance testing environments can prohibit sensitive data usage and public internet access, development environments can permit broader service usage, demonstration environments can have maximum lifetime constraints, and sandbox environments can permit local administrator accounts and public package downloads. The prompts can include a structured set of security policies aligned with compliance frameworks to ensure data encryption and protection, access control through identity management, activity logging and monitoring, threat and vulnerability detection, network traffic security, sensitive data classification and governance, and backup and disaster recovery enforcement.

The policy application agent 167 can generate, as output, a vulnerability report comprising identified security vulnerabilities and suggestive feedback for architectural changes based on the identified vulnerabilities.

The policy application agent 167 can perform sentiment analysis on user feedback using a neural network to determine subsequent workflow steps, comprehending user intent to determine whether to proceed with current suggestions or modify portions according to user feedback, thereby enabling iterative refinement through human-in-the-loop validation. The sentiment analysis can use classification techniques implemented using the algorithm 516 with supervised learning on labeled feedback datasets, wherein the model parameters 522 can be trained to distinguish between acceptance, rejection, and modification intents expressed in natural language user responses. For example, when a user provides feedback such as "I disagree with the encryption recommendation, please re-evaluate the data flow between the API gateway and the database cluster," the policy application agent 167 can tokenize the feedback into a sequence of tokens including ["I", "disagree", "with", "the", "encryption", "recommendation", ",", "please", "re-evaluate", "the", "data", "flow", "between", "the", "API", "gateway", "and", "the", "database", "cluster"]. The tokenized sequence can be processed through an embedding layer to generate vector representations, which are then passed through the neural network to classify the feedback as a modification intent with high confidence. Based on the classification result and the extracted modification target (encryption recommendation for API gateway to database cluster data flow), the policy application agent 167 can trigger a re-execution of the vulnerability analysis specifically targeting the identified architectural components, retrieving updated policy embeddings from the vector database and generating a revised vulnerability assessment focused on the user-specified data flow pathway.

The policy application agent 167 can also reconcile user-provided prompts or specific instructions with organization-level policies stored in the analytics framework 130. For example, when a user provides an instruction such as "allow direct database access from the public load balancer for performance optimization," the policy application agent 167 can compare the user instruction against organizational security policies that prohibit direct connections between public-facing components and internal databases without intervening security controls. The policy application agent 167 can perform semantic similarity matching between the user instruction embedding and policy embeddings in the vector database to identify conflicting policies, and can generate a reconciliation response that acknowledges the user's performance concern while explaining the policy constraint and suggesting compliant alternatives such as implementing a caching layer or read replica with appropriate access controls that satisfy both the performance objective and the security policy requirement.

The diagram generator agent 168 can implement an artificial intelligence architecture generator backed by compliance policies that enables faster architecture restructuring and regeneration compared to manual architecture design processes. The diagram generator agent 168 can receive, as input, the structured representation of the architecture, the vulnerability report, and the compliance policies from the policy application agent 167. The diagram generator agent 168 can invoke a neural network with prompt templates to generate domain-specific language code for architecture diagram generation, wherein the prompts can include the extracted services, connections, identified vulnerabilities, and security enhancement requirements.

The neural network for code generation can be implemented using the AI system 500 described in reference to FIG. 5, wherein the model structure 520 can comprise transformer architectures trained on code corpora in addition to natural language text. Model variants suitable for code generation can include code-specialized language models such as code-trained GPT variants, encoder-decoder models with code synthesis capabilities, and instruction-following models fine-tuned on code generation tasks. The model parameters 522 can be optimized using the optimizer 526 with code-specific loss functions computed by the loss function engine 524, wherein the loss functions can measure syntactic correctness, semantic validity, and adherence to domain-specific language specifications. The regularization engine 528 can apply regularization techniques to prevent overfitting to specific code patterns and improve generalization across diverse architecture configurations.

The neural network can generate domain-specific language code by parsing existing code structure, identifying missing services, embedding security components including web application firewalls, encryption key management services, identity and access management services, audit logging services, monitoring services, network firewalls, and virtual private network endpoints, creating inter-service connections, and organizing services into logical clusters. The diagram generator agent 168 can perform code correction operations by invoking the neural network with error-specific prompt templates to address syntax errors, logical inconsistencies, and structural deficiencies in generated diagram code, including processing error messages, analyzing existing code for structural and syntactic issues, and applying targeted corrections based on error patterns.

The diagram generator agent 168 can perform code validation operations by invoking a review agent implemented using the neural network to perform quality assurance checks on the generated code, including verifying that all services are included, security services are present, connections are valid, no orphan nodes exist, proper cluster organization is maintained, code syntax is correct, and best practices are followed. The review agent can be implemented using the AI system 500 described in reference to FIG. 5, wherein the algorithm 516 can be trained using supervised learning on labeled code quality datasets comprising examples of valid and invalid architecture code with corresponding quality assessments.

The diagram generator agent 168 can execute the generated domain-specific language code using a diagram rendering library to render a visual architecture diagram, and when execution errors occur due to missing class definitions or service mappings, can perform normalization operations to resolve missing services, update import statements, and regenerate the domain-specific language code through iterative correction cycles. The diagram generator agent 168 can generate, as output, a security-enhanced architecture diagram image file, the domain-specific language code, and compliance documentation describing the architectural modifications and their alignment with security policies.

Example User-Interactive Frameworks

Figure 2A:
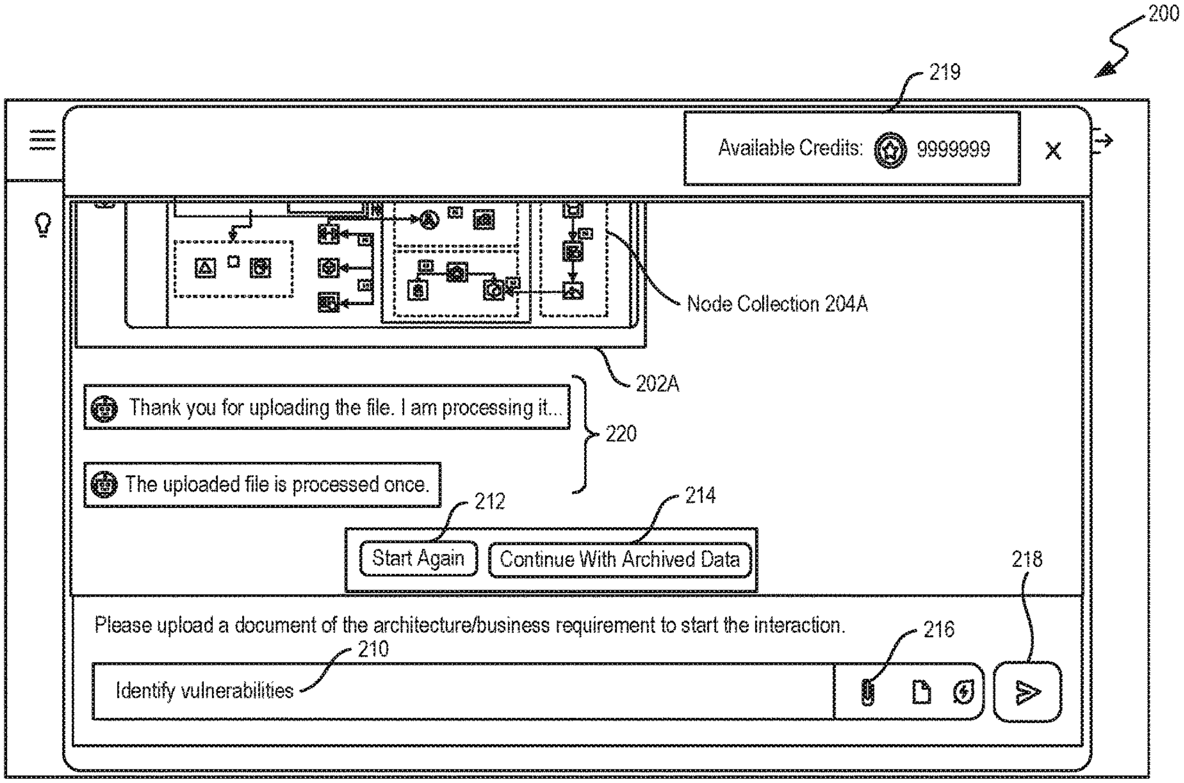
FIGS. 2A, 2B, and 2C illustrate example user-interactive frameworks of the security architecture review automation platform, in accordance with some implementations of the present technology.
Figure 2B:
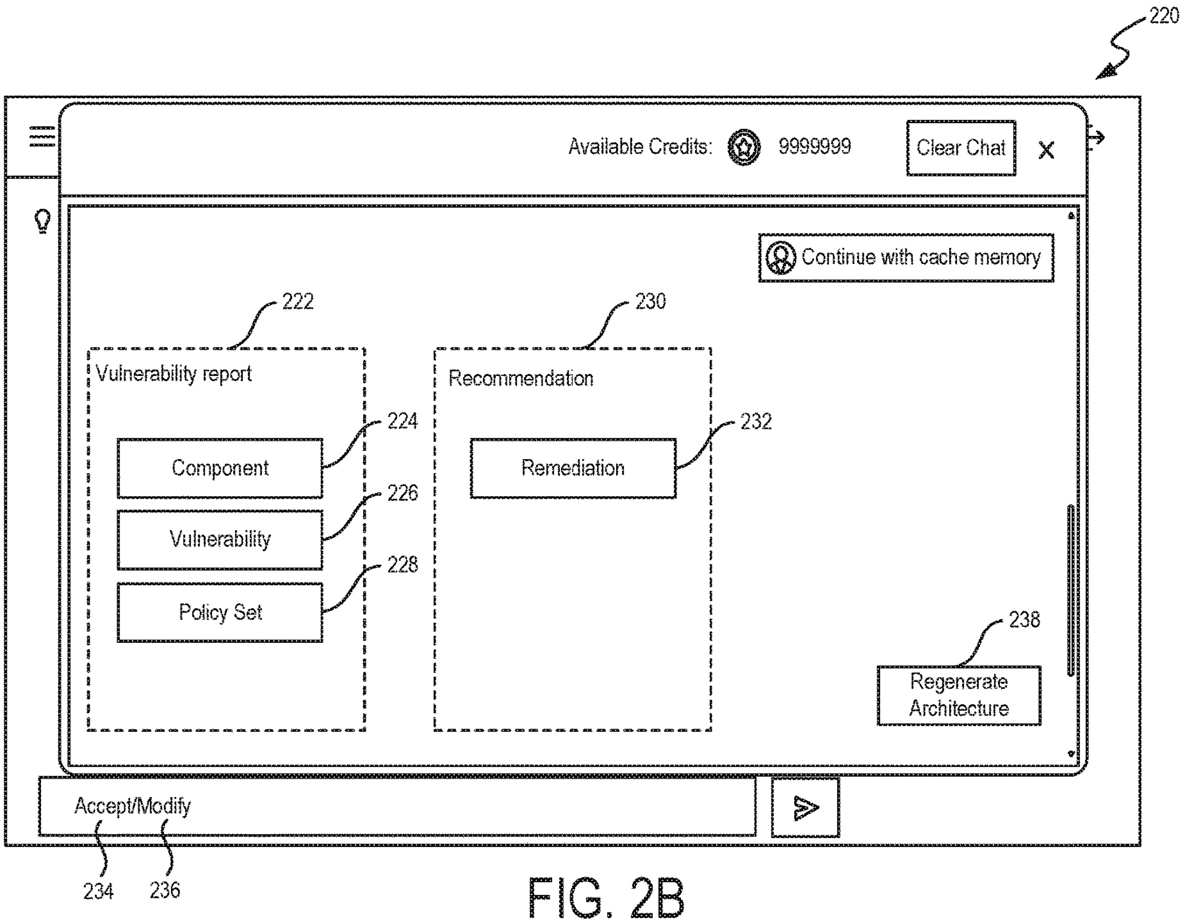
Figure 2C:
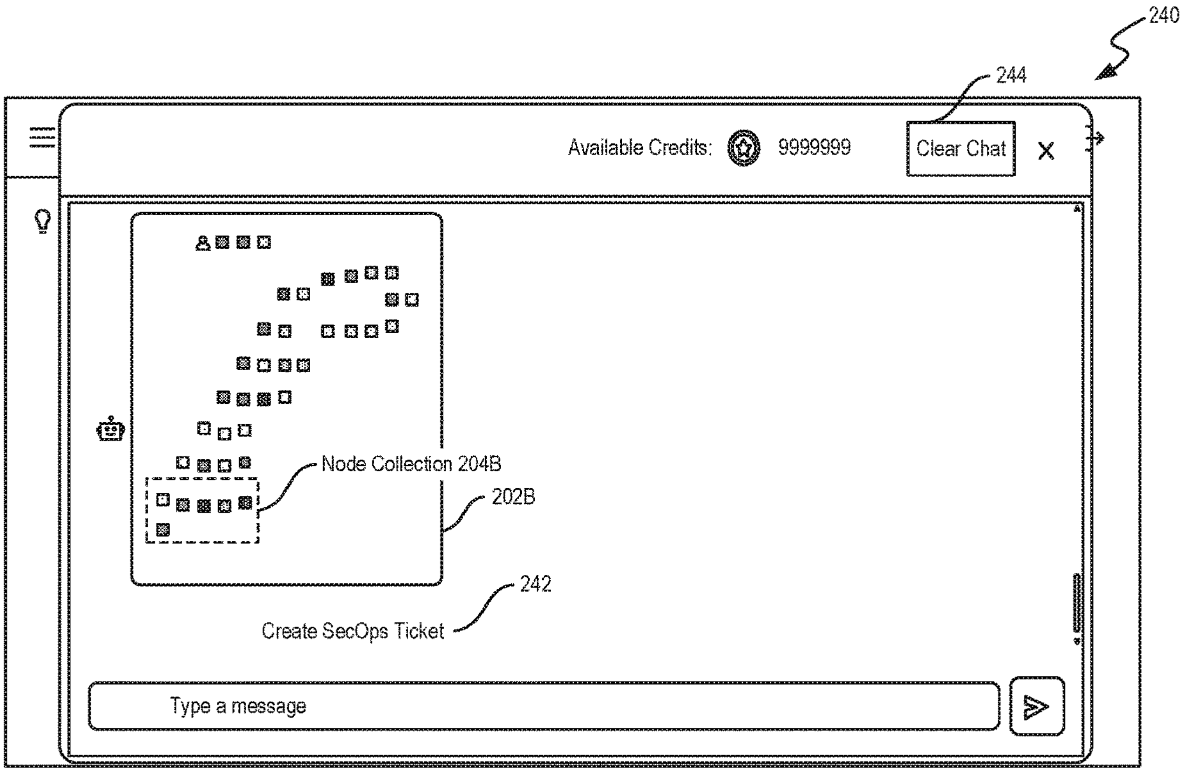

FIGS. 2A, 2B, and 2C illustrate user-interactive frameworks of the security architecture review automation platform 100 of FIG. 1A, in accordance with some implementations of the present technology. FIG. 2A shows an example architecture ingestion and decoder framework 200 of the security architecture review automation platform 100. FIG. 2B shows an example vulnerability framework 220 to the security architecture review automation platform 100. FIG. 2C shows an example architecture regeneration framework 240 to the security architecture review automation platform 100. Entry points to the frameworks can include GUIs, such as the security architecture review agent interface 114.

FIG. 2A shows an example architecture ingestion and decoder framework 200 of the security architecture review automation platform 100. A user (e.g., end user 113*a*) can access the platform 100 via a dashboard rendered by the front-end framework 110 on the user computing device 102. The security architecture review agent interface 114 can provide the dashboard through which the user can upload architecture artifacts, monitor processing status, view credit balances, and access generated outputs. The user can supply a security architecture artifact 202*a* (e.g., an architecture diagram image file), which can include or relate to an input node collection 204*a* (e.g., security architecture components including servers, databases, load balancers, APIs, microservices, containers, and network devices). In some implementations, the input node collection 204*a* is a set of elements parsed or detected from the security architecture artifact 202*a*. In some implementations, the input node collection 204*a* is generated using the security architecture artifact 202*a*.

The image processor agent 166 can receive the architecture diagram image file and perform image preprocessing operations including grayscale conversion to optimize the image for text and icon recognition. The image processor agent 166 can encode the preprocessed image into a base64 format for transmission to the AI framework 132, which can invoke a vision-language model to perform intelligent image analysis. The vision-language model can identify service icons and their corresponding labels, recognize connection patterns between services including lines, arrows, and flow indicators, understand directional relationships and data flow patterns, and extract service names from text labels positioned near service icons. The image processor agent 166 can generate, as output, a structured representation of the architecture comprising identified clusters, services, connections, and directional flow indicators in a machine-readable format, which forms the input node collection 204*a*.

As shown, the user can interact with the platform 100 via the chat 210, which corresponds to the interactive chat session 104 provided by the chat interface 116 of the front-end framework 110. For example, the user can provide a prompt to analyze vulnerabilities in the provided (e.g., imported, referenced, uploaded) artifact. The interactive chat session 104 can provide a conversational interface through which the user can submit architecture artifacts, receive analysis results, provide feedback, and interact with the security architecture review automation platform 100 using natural language inputs.

The user can provide supporting transcripts (text or audio) along with the architecture image through a transcript-supported architecture upload operation. The supporting transcripts can originate from discussions or reviews and provide valuable context to enhance architecture analysis, creation, or approval workflows. When such transcripts are included, the platform 100 can initiate a tailored preprocessing sequence to incorporate the insights into the overall evaluation process, including extracting transcript content using speech-to-text conversion for audio files and directly reading textual file content, and performing text cleaning and normalization on extracted transcripts to prepare them for downstream processing.

The uploaded architecture image can be classified as either a new unprocessed submission or a previously processed submission. This determination can be made by converting the image into a base64-encoded format and subsequently into hexadecimal code, wherein the resulting hexadecimal code is compared with those stored in a directory associated with the user identifier in the object data store 136. A match indicates a previously processed upload, whereas no match indicates an unprocessed upload that is treated as new. When a new unprocessed upload is detected, the platform 100 can initiate a series of steps including extracting services and components and their interconnections from the uploaded architecture image, validating the extracted entities and relationships against environment-specific security compliance policies, identifying vulnerabilities and architectural gaps, and providing recommendations for modifying the architecture to address the gaps and improve overall compliance.

The user can utilize the delete control 216 to remove artifacts or sessions, the execute control 218 to initiate processing operations through the security architecture review agent framework 122, and the credit monitor control 219 to view remaining credits managed by the credit management engine 164.

FIG. 2B shows an example vulnerability framework 220 of the security architecture review automation platform 100. As shown, the security architecture artifact 202*a* or the input node collection 204*a* can be processed by the policy application agent 167 to generate a vulnerability report 222. The policy application agent 167 can transform the extracted services and their interconnections into vector embeddings using an embedding model, and can perform policy embedding search operations using vector similarity matching against a vector database in the analytics framework 130 storing a collection of security and compliance policies. The vulnerability report 222 can include a component set 224 identifying the architectural components analyzed, a vulnerability set 226 comprising identified security vulnerabilities, and a policy set 228 indicating the compliance policies against which the architecture was evaluated.

The policy application agent 167 can retrieve policies relevant to the extracted services by querying the vector database in the analytics framework 130, which stores a collection of security and compliance policies. The policy data can include organizational compliance policies aligned with global compliance frameworks such as CCPA and CIS Controls. The policy data can specify requirements for data encryption and protection using encryption key management services and secrets management services, access control through identity management and single sign-on federation, activity logging and monitoring via audit trail services and configuration management services, threat and vulnerability detection using security monitoring and inspection services, network traffic security with virtual private clouds, firewalls, web application firewalls, and distributed denial-of-service protection services, sensitive data classification and governance using data catalog and access governance services, backup and disaster recovery enforcement through backup services and disaster recovery services, and secure infrastructure configuration and patching using systems management and infrastructure-as-code services.

Policy data can be stored in any suitable data store of the platform 100. The analytics framework 130 can store policy data as vector embeddings in the vector database, enabling policy embedding search operations using vector similarity matching to retrieve relevant compliance policies based on semantic similarity to extracted architectural components. The structured data store 134 can store policy records with unique identifiers, policy categories, applicable environments, and compliance framework mappings. The object data store 136 can store policy documentation files, policy templates, and policy configuration artifacts in structured directories. The computing database 170 can store policy metadata, policy versioning information, and policy-to-component mappings for audit and governance purposes.

The policy application agent 167 can analyze elements of the input node collection 204*a* to identify vulnerabilities by examining nodes representing architectural components, connectors representing relationships and data flows between components, and metadata associated with each node and connector. The metadata can include component configurations, access control settings, encryption parameters, network segmentation attributes, and authentication protocol specifications. The policy application agent 167 can traverse the node collection to identify vulnerability patterns including missing security controls between connected components, inadequate encryption configurations for data flow connectors, improper network segmentation indicated by direct connections between public-facing nodes and internal database nodes, and absent authentication mechanisms between service nodes. The policy application agent 167 can extract vulnerabilities by comparing the structural arrangement of nodes and connectors against known vulnerability patterns and security policy requirements stored as embeddings in the vector database. For example, the policy application agent 167 can identify that a connector between a load balancer node and a database node lacks an intervening firewall node, constituting a vulnerability that violates network security policies. The policy application agent 167 can invoke the AI framework 132 with constructed prompts that include the extracted services, relationships, retrieved policies, and environment-specific instructions to perform compliance validation and vulnerability identification. The prompts can incorporate chain-of-thought processing to enable logical reasoning about architectural component arrangements and their security implications.

The policy application agent 167 can apply retrieved policies to identify vulnerabilities through a systematic evaluation process. For each extracted architectural component and connection, the policy application agent 167 can determine applicable policy requirements based on component type, data sensitivity classification, and deployment environment. The policy application agent 167 can evaluate whether the architectural arrangement satisfies each applicable policy requirement by analyzing component configurations, connection attributes, and the presence or absence of required security controls. When a policy requirement specifies that data flows between application services and storage services must be encrypted, the policy application agent 167 can examine connectors between such nodes to verify the presence of encryption service nodes or encryption configuration attributes. When a policy requirement mandates multi-factor authentication for access to sensitive resources, the policy application agent 167 can verify that identity provider nodes with multi-factor authentication capabilities are present in authentication pathways. The policy application agent 167 can generate vulnerability entries for each policy requirement that is not satisfied by the current architectural arrangement, associating each vulnerability with the specific policy violated, the affected components, and the nature of the non-compliance. The policy application agent 167 can prioritize identified vulnerabilities based on policy severity classifications, potential impact assessments, and exploitability factors derived from the architectural context.

Vulnerability data can be stored in any suitable data store of the platform 100. The structured data store 134 can store vulnerability records with unique identifiers, timestamps, severity classifications, affected component identifiers, and remediation status indicators for audit tracking and workflow management purposes. The object data store 136 can store vulnerability reports, intermediate analysis outputs, and historical vulnerability data in structured directories organized by user identifier and task identifier. The analytics framework 130 can store identified vulnerabilities as vector embeddings in the vector database, enabling efficient similarity-based retrieval and comparison of vulnerability patterns across different architecture reviews. The computing database 170 can store vulnerability data including vulnerability metadata, component associations, policy mappings, and remediation tracking information.

The platform 100 can generate a remediation recommendation 230 in connection with identifying and generating the vulnerability set 226 for the component set 224 based on the policy set 228. The remediation recommendation 230 can include a remediation item 232 specifying architectural changes to address identified vulnerabilities. The remediation item 232 can be accepted 234 or modified 236 by the user through the interactive chat session 104, implementing a human-in-the-loop design pattern that combines AI-driven automation with human judgment and oversight. The policy application agent 167 can perform sentiment analysis on user feedback using the AI framework 132 to determine subsequent workflow steps, comprehending user intent to determine whether to proceed with current suggestions or modify portions according to user feedback. Additionally, the vulnerability framework 220 can enable the user to regenerate 238 at least a portion of the vulnerability report 222 or remediation recommendation 230 through iterative refinement cycles coordinated by the multi-agent orchestrator 165.

The vulnerability framework 220 can implement a validation mechanism that analyzes user feedback, determines satisfaction levels, and conditionally modifies extracted architectural processes based on user requirements. The policy application agent 167 can generate a process message for diagram requests and use natural language processing to classify user intent and sentiment within an architectural context.

When user satisfaction is detected, the platform 100 can mark the workflow as accepted by setting a process choice indicator to indicate no changes are required, update the interface with a confirmation message, flag validation as completed, persist the state, and transition to domain-specific language code generation.

For modification requests, the policy application agent 167 can normalize input, retrieve current architecture data, load prompt templates from configuration files, construct context-aware prompts, and invoke the AI framework 132 to process changes aligned with security policies. The AI framework 132 can use deterministic settings and structured prompts that integrate architectural guidelines and security policies, with prompt engineering including dynamic template rendering and domain-specific instructions. State updates can be atomic and conditional, ensuring consistency and enabling rollback, with persistence using encoding and write-verify cycles for reliability. Based on user feedback, updated vulnerabilities and suggestions, the state can be updated accordingly.

In the case of a previously processed upload, the user can be presented with options to continue with archived data or start over. When continuing with archived data, the platform 100 can skip the initial steps of process extraction and validation. The platform 100 can identify the matching image in the object data store 136 and retrieve its associated task identifier. Using this task identifier, the platform 100 can load the stored state, chat history, generated architecture, and related data from the corresponding folder. A new task identifier can then be generated and consistently applied across all components including directory names, file names, and internal state to maintain workflow continuity. When the user selects to start over, the platform 100 can initiate a fresh workflow, treating the upload as new, creating a new task identifier, initializing state and input/output structures, and executing all processing steps as defined for unprocessed uploads.

FIG. 2C shows an example architecture regeneration framework 240 of the security architecture review automation platform 100. The architecture regeneration framework 240 can cause the generation of a dynamically generated security schema 202*b* through operations performed by the diagram generator agent 168. The dynamically generated security schema 202*b* can include a dynamically generated node collection 204*b* representing the security-enhanced architecture with embedded compliance policies and remediated vulnerabilities.

The diagram generator agent 168 can perform DSL code generation operations to transform the dynamically generated node collection 204*b* into executable code for diagram generation. The diagram generator agent 168 can invoke the AI framework 132 with prompt templates to generate domain-specific language code for architecture diagram generation, wherein the prompts can include the extracted services, connections, identified vulnerabilities, and security enhancement requirements. The DSL code generation operations can include process relationship analysis that ingests validated process relationships from state fields, template selection that dynamically selects appropriate prompt templates based on complexity assessment, code generation that uses neural network capabilities to generate syntactically correct DSL code, and output formatting that structures generated code according to predefined diagram specifications. The AI framework 132 can implement complexity-aware processing with differentiation between high-level and low-level prompt templates, integrate with diagram library specifications for consistent output formatting, and employ structured variable substitution for dynamic prompt generation. The AI framework 132 can generate enhanced domain-specific language code by parsing existing code structure, identifying missing services, embedding security components including web application firewalls, encryption key management services, identity and access management services, audit logging services, monitoring services, network firewalls, and virtual private network endpoints, creating inter-service connections, and organizing services into logical clusters.

The diagram generator agent 168 can perform DSL code correction operations to address errors encountered during execution of the generated DSL code. The DSL code correction operations can implement an intelligent error correction mechanism for DSL code refinement, addressing syntax errors, logical inconsistencies, and structural deficiencies in generated diagram code. The DSL code correction operations can include error analysis that processes exception messages and diagram generation errors, code inspection that analyzes existing DSL code for structural and syntactic issues, iterative correction that applies targeted corrections based on error patterns, and validation integration that coordinates with validation systems for quality assurance.

The diagram generator agent 168 can implement diagram count tracking for iteration management and convergence control, utilize error-specific prompt templates for targeted correction strategies, maintain backward compatibility with existing DSL code structures, and enforce standardized graph attributes for consistent diagram output. The DSL code correction operations can preserve original code artifacts while maintaining correction history, update state with corrected code and explanatory metadata, implement file-based persistence for correction audit trails, gracefully handle file input/output exceptions during code retrieval, implement fallback mechanisms for missing or corrupted DSL artifacts, maintain data consistency across correction iterations, and provide comprehensive error reporting for debugging and optimization.

The diagram generator agent 168 can perform DSL code validation operations to establish a comprehensive validation framework for ensuring DSL code quality, syntactic correctness, and architectural compliance before final diagram generation and deployment. The DSL code validation operations can include syntax validation that performs comprehensive syntax checking against DSL specifications, semantic analysis that validates logical consistency of architectural relationships, compliance verification that ensures adherence to established coding standards and conventions, and quality assessment that evaluates code quality metrics and architectural best practices.

The diagram generator agent 168 can integrate with a DSL review agent for multi-layered validation, wherein the DSL review agent can be based on prompt-supported neural network invocations that enforce instructions on the generated DSL code, such as prohibiting duplicate service nodes wherein if a service connects to multiple other services the same node is used for all connections, and requiring that all clusters present in the diagrams code are created within a virtual private cloud cluster.

The DSL code validation operations can provide detailed validation reports with actionable feedback, support both automated and manual validation workflows, maintain validation state across processing pipeline stages, implement comprehensive logging for validation audit trails, update state with validation results and recommendations, preserve validation history for continuous improvement analysis, seamlessly integrate with upstream code generation components, provide feedback loops for iterative code improvement, optimize validation performance through intelligent caching mechanisms, and support extensible validation rule frameworks for future enhancements.

The diagram generator agent 168 can execute the generated domain-specific language code using a diagram rendering library to render a visual architecture diagram, and when execution errors occur due to missing class definitions or service mappings, can perform normalization operations to resolve missing services, update import statements, and regenerate the domain-specific language code through iterative correction cycles. A SecOps ticket 242 can be generated for the dynamically generated node collection 204*b* through the security operations ticket generator 118, which can communicate with the security operations API 124 to create a ticket in an external security operations management system. The ticket payload can include the modified architecture diagram, chat history documentation, original input artifacts, relevant transcripts, and policy documentation for security operations review and remediation tracking.

Example Platform Operations

Figure 3:
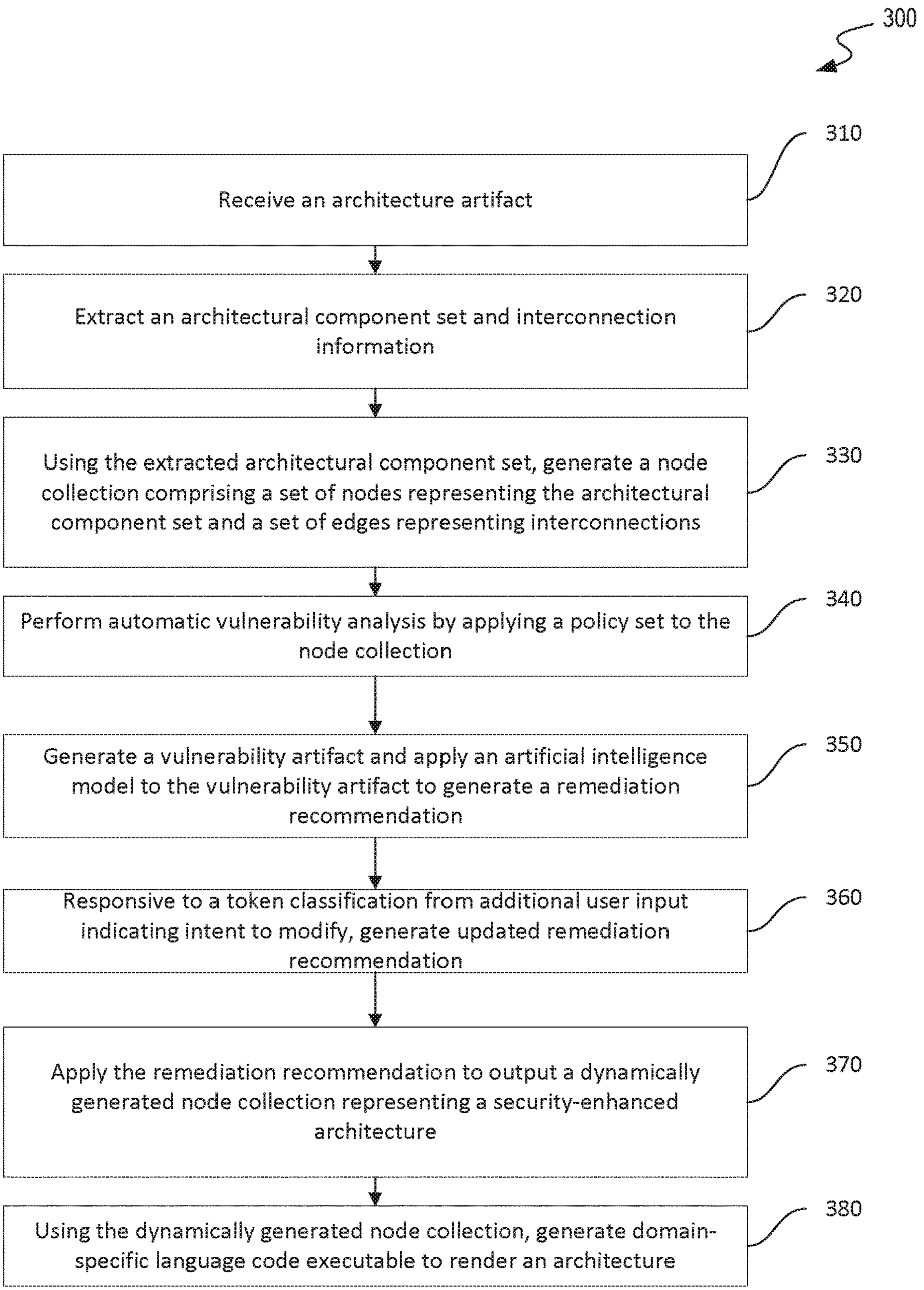
FIG. 3 is a flow diagram that illustrates example operations of the security architecture review automation platform, in accordance with some implementations of the present technology.

FIG. 3 is a flow diagram that illustrates example operations 300 for security architecture review automation of the platform 100, in accordance with some implementations of the present technology. The operations 300 can be performed by one or more non-transitory, computer-readable storage media excluding transitory signals and comprising instructions recorded thereon, wherein the instructions, when executed by at least one data processor of a computing system, cause the computing system to perform the operations described herein.

At 310, platform operations can include receiving an architecture artifact comprising a system architecture image. The architecture artifact can be uploaded by an end user through the interactive chat session 104 or the security architecture review agent interface 114. The system architecture image can comprise a visual representation of a cloud-based deployment, a microservices architecture, a network topology diagram, or any other system design diagram that depicts architectural components and their interconnections. In some implementations, the platform 100 can also receive supporting transcripts (text or audio) along with the architecture image through a transcript-supported architecture upload operation. The supporting transcripts can originate from discussions or reviews and provide valuable context to enhance architecture analysis, creation, or approval workflows.

At 320, platform operations can include applying a computer vision model to the system architecture image to extract an architectural component set and interconnection information. The architectural component set can comprise icons associated with service names, wherein the icons represent discrete functional units within the system architecture including servers, databases, load balancers, application programming interfaces (APIs), microservices, containers, virtual machines, storage systems, identity providers, message queues, and network devices such as routers, switches, and gateways. The interconnection information can comprise directionality information for connections between icons, including lines, arrows, and flow indicators that represent data flows, dependencies, and communication pathways between components.

In some implementations, applying the computer vision model comprises encoding the architecture artifact for processing by the computer vision model. The image processor agent 166 can perform image preprocessing operations including grayscale conversion to optimize the image for text and icon recognition. The image processor agent 166 can encode the preprocessed image into a base64 format for transmission to a vision-language model. The vision-language model can be invoked to identify icons and corresponding labels, recognize connection patterns between services, and extract service names from text labels positioned near service icons. The vision-language model can identify cloud service icons and their corresponding labels, recognize connection patterns between services including lines, arrows, and flow indicators, understand directional relationships and data flow patterns, and extract service names from text labels. For example, when processing a cloud architecture diagram, the vision-language model can identify icons representing compute instances, storage buckets, database services, load balancers, and API gateways, and can extract the associated service names and connection relationships from the visual representation.

In some implementations, the platform 100 can extract and normalize transcript content associated with the architecture artifact. When supporting transcripts are included with the architecture image, the platform 100 can initiate a tailored preprocessing sequence to incorporate the insights into the overall evaluation process, including extracting transcript content using speech-to-text conversion for audio files and directly reading textual file content, and performing text cleaning and normalization on extracted transcripts to prepare them for downstream processing. The transcript content can provide additional context regarding architectural decisions, security requirements, and compliance considerations that supplement the visual information extracted from the architecture image.

At 330, platform operations can include generating a node collection based on the extracted architectural component set and the interconnection information. The node collection can comprise nodes representing the architectural component set and edges representing the interconnection information. The node collection can be generated comprising clusters, services, connections, and directional flow indicators based on the image analysis and the transcript content. Each node in the node collection can be associated with metadata, attributes, properties, labels, or other descriptive information including component type, configuration parameters, security classifications, and relationship identifiers. The edges in the node collection can encode semantic information such as data flow direction, trust boundaries, authentication requirements, or communication protocols. For example, a node collection generated from a microservices architecture diagram can comprise nodes representing individual microservices, database nodes, API gateway nodes, and load balancer nodes, with edges representing HTTP connections, database queries, message queue communications, and authentication flows between the services.

At 340, platform operations can include performing vulnerability analysis on the node collection. The vulnerability analysis operations can comprise transforming nodes in the node collection into vector embeddings using an embedding model, and performing policy embedding search operations using vector similarity matching against a vector database storing policy data to retrieve compliance policies and generate a vulnerability report.

In some implementations, performing the vulnerability analysis comprises transforming the architectural component set and the interconnection information into the vector embeddings. The policy application agent 167 can transform the extracted services and their interconnections into vector embeddings using an embedding model. The embedding model can be implemented using encoder-based transformer architectures optimized for generating dense vector representations. The embedding model can be trained using contrastive learning techniques or masked language modeling objectives to learn semantic representations of security policies and architectural components.

The vulnerability analysis operations can comprise retrieving the compliance policies from the vector database, the compliance policies comprising policies related to authentication, data encryption, network security, and monitoring. The vector similarity matching can retrieve relevant compliance policies across categories including authentication and access control, data encryption, network security, monitoring and logging, backup and recovery, and container security. The policy data can include organizational compliance policies aligned with global compliance frameworks such as CCPA and CIS Controls. The policy data can specify requirements for data encryption and protection using encryption key management services and secrets management services, access control through identity management and single sign-on federation, activity logging and monitoring via audit trail services and configuration management services, threat and vulnerability detection using security monitoring and inspection services, network traffic security with virtual private clouds, firewalls, web application firewalls, and distributed denial-of-service protection services, sensitive data classification and governance using data catalog and access governance services, backup and disaster recovery enforcement through backup services and disaster recovery services, and secure infrastructure configuration and patching using systems management and infrastructure-as-code services.

The vulnerability analysis operations can comprise invoking a neural network with prompts comprising the architectural component set, the compliance policies, and environment-specific instructions to perform compliance validation. The environment-specific instructions can vary based on the deployment environment selected by the end user, wherein production environments can permit sensitive data access and public internet access via elastic IP addresses, user acceptance testing environments can prohibit sensitive data usage and public internet access, development environments can permit broader service usage including any cloud service, demonstration environments can have maximum lifetime constraints such as 90 days, and sandbox environments can permit local administrator accounts and public downloads of packages and utilities. The prompts can include a structured set of security policies aligned with compliance frameworks to ensure data encryption and protection, access control through identity management, activity logging and monitoring, threat and vulnerability detection, network traffic security, sensitive data classification and governance, and backup and disaster recovery enforcement.

The vulnerability analysis operations can comprise identifying the vulnerabilities by comparing the architectural component set against vulnerability patterns stored in the vector database. The policy application agent 167 can analyze elements of the node collection to identify vulnerabilities by examining nodes representing architectural components, connectors representing relationships and data flows between components, and metadata associated with each node and connector. The policy application agent 167 can traverse the node collection to identify vulnerability patterns including missing security controls between connected components, inadequate encryption configurations for data flow connectors, improper network segmentation indicated by direct connections between public-facing nodes and internal database nodes, and absent authentication mechanisms between service nodes. For example, the policy application agent 167 can identify that a connector between a load balancer node and a database node lacks an intervening firewall node, constituting a vulnerability that violates network security policies. As another example, the vulnerability analyzer can identify that an uploaded architecture lacks OAuth 2.0 federated authentication and advanced token-based authorization, and can recommend integrating OAuth 2.0 for federated identity management and secure token-based authentication. As another example, the vulnerability analyzer can identify missing security services such as Cloud DLP for data storage and processing services, CSPM and CWPP monitoring for compute, storage, and network services, and encryption services for data at rest and in transit.

At 350, platform operations can include using the vulnerability report to generate a vulnerability artifact comprising a component set, a vulnerability set, and a policy item set associated with vulnerabilities in the vulnerability set. The component set can identify the architectural components analyzed, the vulnerability set can comprise identified security vulnerabilities with associated severity classifications and affected component identifiers, and the policy item set can indicate the compliance policies against which the architecture was evaluated. Platform operations can include applying an artificial intelligence model to the vulnerability artifact to generate a remediation recommendation specifying architectural changes to address the vulnerabilities. The remediation recommendation can include remediation items specifying architectural changes such as inserting security components, reconfiguring network segmentation, adjusting access control configurations, adding encryption services, and implementing monitoring capabilities. For example, a remediation recommendation can specify adding a web application firewall between a public-facing load balancer and application services, implementing encryption key management services for data at rest, and adding audit logging services for compliance monitoring.

At 360, platform operations can include determining a user intent and modifying the remediation recommendation. The platform 100 can present the remediation recommendation to a user through an interactive chat session. The interactive chat session 104 can provide a conversational interface through which end users can receive analysis results, provide feedback, and interact with the security architecture review automation platform 100 using natural language inputs. The platform 100 can receive user feedback indicating acceptance, rejection, or modification of the remediation recommendation.

In some implementations, the platform 100 can perform sentiment analysis on the user feedback to classify a user intent. The policy application agent 167 can perform sentiment analysis on user feedback using a neural network to determine subsequent workflow steps, comprehending user intent to determine whether to proceed with current suggestions or modify portions according to user feedback. The sentiment analysis can use classification techniques implemented using supervised learning on labeled feedback datasets, wherein the model parameters can be trained to distinguish between acceptance, rejection, and modification intents expressed in natural language user responses. For example, when a user provides feedback such as "I disagree with the encryption recommendation, please re-evaluate the data flow between the API gateway and the database cluster," the policy application agent 167 can tokenize the feedback into a sequence of tokens, process the tokenized sequence through an embedding layer to generate vector representations, and pass the vectors through the neural network to classify the feedback as a modification intent with high confidence.

Based on the user intent indicating modification, the platform 100 can construct prompts comprising the user feedback and current architecture data. The policy application agent 167 can normalize input, retrieve current architecture data, load prompt templates from configuration files, construct context-aware prompts, and invoke the AI framework 132 to process changes aligned with security policies. The AI framework 132 can use deterministic settings and structured prompts that integrate architectural guidelines and security policies, with prompt engineering including dynamic template rendering and domain-specific instructions. The platform 100 can regenerate a portion of the dynamically generated node collection based on the user feedback. Based on the classification result and the extracted modification target, the policy application agent 167 can trigger a re-execution of the vulnerability analysis specifically targeting the identified architectural components, retrieving updated policy embeddings from the vector database and generating a revised vulnerability assessment focused on the user-specified data flow pathway.

In some implementations, the policy application agent 167 can reconcile user-provided prompts or specific instructions with organization-level policies stored in the analytics framework 130. For example, when a user provides an instruction such as "allow direct database access from the public load balancer for performance optimization," the policy application agent 167 can compare the user instruction against organizational security policies that prohibit direct connections between public-facing components and internal databases without intervening security controls. The policy application agent 167 can perform semantic similarity matching between the user instruction embedding and policy embeddings in the vector database to identify conflicting policies, and can generate a reconciliation response that acknowledges the user's performance concern while explaining the policy constraint and suggesting compliant alternatives such as implementing a caching layer or read replica with appropriate access controls that satisfy both the performance objective and the security policy requirement.

At 370, platform operations can include generating, by an artificial intelligence architecture generator, a dynamically generated node collection representing a security-enhanced architecture by embedding security components into the node collection based on the vulnerability set, the remediation recommendation or the modified remediation recommendation, and the compliance policies. The diagram generator agent 168 can implement the artificial intelligence architecture generator backed by compliance policies that enables faster architecture restructuring and regeneration compared to manual architecture design processes.

In some implementations, generating the dynamically generated node collection comprises invoking a neural network with prompt templates comprising the architectural component set, the vulnerabilities, and security enhancement requirements. The diagram generator agent 168 can receive, as input, the structured representation of the architecture, the vulnerability report, and the compliance policies from the policy application agent 167. The diagram generator agent 168 can invoke the AI framework 132 with prompt templates to generate domain-specific language code for architecture diagram generation, wherein the prompts can include the extracted services, connections, identified vulnerabilities, and security enhancement requirements.

Generating the dynamically generated node collection can comprise identifying missing services based on the remediation recommendation. The neural network can generate enhanced domain-specific language code by parsing existing code structure and identifying missing services that are required to address the identified vulnerabilities and satisfy the compliance policies.

Generating the dynamically generated node collection can comprise embedding the security components into the node collection, the security components comprising firewalls, encryption services, identity management services, and monitoring services. The security components can include web application firewalls for protecting public-facing application endpoints, encryption key management services for managing cryptographic keys and ensuring data encryption at rest and in transit, identity and access management services for implementing authentication and authorization controls, audit logging services for capturing security-relevant events and maintaining compliance audit trails, monitoring services for detecting anomalies and security incidents, network firewalls for controlling network traffic between security zones, and virtual private network endpoints for securing remote access connections. For example, when the vulnerability set indicates missing encryption for data flows between application services and storage services, the diagram generator agent 168 can embed encryption key management service nodes and configure connections to ensure encrypted data transmission.

Generating the dynamically generated node collection can comprise creating inter-service connections between the security components and the architectural component set. The diagram generator agent 168 can establish connections between newly embedded security components and existing architectural components to ensure proper integration of security controls into the architecture. For example, when embedding a web application firewall, the diagram generator agent 168 can create connections from the public-facing load balancer to the web application firewall and from the web application firewall to the application services, ensuring that all incoming traffic passes through the firewall before reaching the application layer.

Generating the dynamically generated node collection can comprise organizing services into logical clusters. The diagram generator agent 168 can organize services into functional clusters based on security boundaries, network zones, and operational responsibilities. For example, the diagram generator agent 168 can organize public-facing services into a demilitarized zone cluster, application services into an application tier cluster, and database services into a data tier cluster, with appropriate security controls positioned at cluster boundaries.

In some implementations, generating the dynamically generated node collection further comprises performing code validation operations by invoking a review agent to perform quality assurance checks on the dynamically generated node collection. The review agent can perform quality assurance checks on the generated code, including verifying that all services are included, security services are present, connections are valid, no orphan nodes exist, proper cluster organization is maintained, code syntax is correct, and best practices are followed. The review agent can be implemented using the AI framework 132 with prompt-supported neural network invocations that enforce instructions on the generated code, such as prohibiting duplicate service nodes wherein if a service connects to multiple other services the same node is used for all connections, and requiring that all clusters present in the diagrams code are created within a virtual private cloud cluster.

When the review agent identifies issues, the platform 100 can perform code correction operations to address syntax errors and structural deficiencies. The code correction operations can implement an intelligent error correction mechanism for code refinement, addressing syntax errors, logical inconsistencies, and structural deficiencies in generated diagram code. The code correction operations can include error analysis that processes exception messages and diagram generation errors, code inspection that analyzes existing code for structural and syntactic issues, iterative correction that applies targeted corrections based on error patterns, and validation integration that coordinates with validation systems for quality assurance.

The platform 100 can perform subsequent review iterations until the dynamically generated node collection satisfies predefined quality criteria. The diagram generator agent 168 can implement diagram count tracking for iteration management and convergence control, utilize error-specific prompt templates for targeted correction strategies, maintain backward compatibility with existing code structures, and enforce standardized graph attributes for consistent diagram output. The code correction operations can preserve original code artifacts while maintaining correction history, update state with corrected code and explanatory metadata, implement file-based persistence for correction audit trails, gracefully handle file input/output exceptions during code retrieval, implement fallback mechanisms for missing or corrupted artifacts, maintain data consistency across correction iterations, and provide comprehensive error reporting for debugging and optimization.

At 380, the platform operations can include generating domain-specific language code based on the dynamically generated node collection, wherein the domain-specific language code is executable to render a visual architecture diagram. The diagram generator agent 168 can perform DSL code generation operations to transform the dynamically generated node collection into executable code for diagram generation.

In some implementations, the platform 100 can perform process relationship analysis on the dynamically generated node collection. The DSL code generation operations can include process relationship analysis that ingests validated process relationships from state fields, analyzing service relationships to understand operational dependencies and defining security boundaries across clusters and components.

The platform 100 can select a prompt template based on a complexity metric derived from the dynamically generated node collection. The DSL code generation operations can include template selection that dynamically selects appropriate prompt templates based on complexity assessment, differentiating between high-level and low-level prompt templates based on the architecture complexity level specified by the end user. The AI framework 132 can implement complexity-aware processing with differentiation between high-level and low-level prompt templates, integrate with diagram library specifications for consistent output formatting, and employ structured variable substitution for dynamic prompt generation.

The platform 100 can execute the domain-specific language code to render the visual architecture diagram. The diagram generator agent 168 can execute the generated domain-specific language code using a diagram rendering library to render a visual architecture diagram incorporating recommended security services such as web application firewalls, encryption key management services, identity and access management services, audit logging services, and network firewalls.

When execution errors occur, the platform 100 can perform normalization operations comprising resolving missing service definitions and regenerating the domain-specific language code through iterative correction cycles. When execution errors occur due to missing class definitions or service mappings, the diagram generator agent 168 can perform normalization operations to resolve missing services, update import statements, and regenerate the domain-specific language code through iterative correction cycles. The normalization operations can include resolving missing class definitions by mapping detected services to available diagram library components, generating import statements for identified components, and updating service references to ensure syntactic correctness.

In some implementations, the platform 100 can generate compliance context documentation through the AI framework 132. The platform 100 can produce documentation outputs including an architecture overview describing high-level design and service interactions, security rationale providing justification for applied security measures, compliance mappings indicating alignment with regulatory frameworks (e.g., SOC 2, GDPR, HIPAA), and best practice recommendations for scalability, resilience, and governance. The compliance context documentation can provide a transparent and auditable record of architectural decisions for stakeholders.

In some implementations, the platform 100 can generate a security operations ticket for the dynamically generated node collection through the security operations ticket generator 118. The security operations ticket generator 118 can communicate with the security operations API 124 to create a ticket in an external security operations management system. The ticket payload can include the modified architecture diagram, chat history documentation, original input artifacts, relevant transcripts, and policy documentation for security operations review and remediation tracking. When the end user elects to forward the finalized architecture for security operations review, the platform 100 can prompt the end user to provide additional details including contact information, project name, project objective, department, and technology domain.

Example Computing Environment

FIG. 4 is a system diagram illustrating an example of a computing environment in which the disclosed security architecture review automation platform 100 operates in some implementations. In some implementations, environment 400 includes one or more client computing devices 405A-D, examples of which can host the platform 100. Client computing devices 405 operate in a networked environment using logical connections through network 430 to one or more remote computers, such as a server computing device.

In some implementations, server 410 is an edge server which receives client requests and coordinates fulfillment of those requests through other servers, such as servers 420A-C. In some implementations, servers 410 and 420, or associated computing devices, comprise computing systems, such as the platform 100. Though each server 410 and 420, or associated computing device, is displayed logically as a single server, server computing devices can each be a distributed computing environment encompassing multiple computing devices located at the same or at geographically disparate physical locations. In some implementations, each server 420 corresponds to a group of servers.

Client computing devices 405 and servers 410 and 420, or associated computing devices, can each act as a server or client to other server or client devices. In some implementations, servers (410, 420A-C) connect to a corresponding database (415, 425A-C). As discussed above, each server 420 can correspond to a group of servers, and each of these servers can share a database or can have its own database. Databases 415 and 425 warehouse (e.g., store) information such as session objects and metadata, credit data, connectivity data, framework data, user objects and metadata, input artifacts, output artifacts, node collections, vulnerability data, component data, policy data, remediation data, agent definitions, chat history, ontologies, variable descriptions, embeddings, vectors, indexes, training information (inputs, outputs, validation information such as scores), thresholds, and the like. Though databases 415 and 425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN) but can also be other wired or wireless networks. In some implementations, network 430 is the Internet or some other public or private network. Client computing devices 405 are connected to network 430 through a network interface, such as by wired or wireless communication. While the connections between server 410 and servers 420 are shown as separate connections, these connections can be any kind of local, wide area, wired, or wireless network, including network 430 or a separate public or private network.

Example Artificial Intelligence Architecture

FIG. 5 illustrates a layered architecture of an artificial intelligence (AI) system 500 that can implement the AI/ML models of the platform 100, in accordance with some implementations of the present technology. Example AI/ML models can include one or more executable algorithms stored at computing databases 415, 425 and/or retrieved from external service providers (e.g., a third-party cloud host) via the network 430 of the example computing environment 400. Accordingly, the computing environment 400 and/or components thereof (e.g., servers 410, 420, databases 415, 425, network 430, and/or the like) can include, or be incorporated within, one or more components of the AI system 500. The AI system 500 provides a comprehensive software stack capable of hosting suitable runtime environments for one or more operations of AI/ML models, as further described herein.

As shown, the AI system 500 can include a set of layers, which conceptually organize elements within an example network topology for the AI system's architecture to implement a particular AI model. Generally, an AI model is a computer-executable program implemented by the AI system 500 that analyses input data to generate inferential output data (e.g., a classification label for input feature vectors). Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 4 and 7. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) (such as Intel x86, AMD64, or ARM processors) and graphics processing units (GPUs) (such as NVIDIA Tesla, AMD Radeon, or Intel Xe architectures). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC) (or field-programmable gate arrays (FPGAs) or tensor processing units (TPUs)). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider (such as AWS, Azure, Google Cloud Platform, or specialized AI cloud providers). The hardware platform 510 can also include computer memory for storing data about the AI model, application of the AI model, and training data for the AI model. The computer memory can be a form of random-access memory (RAM), such as dynamic RAM (DRAM), static RAM (SRAM), and non-volatile RAM (NVRAM or flash memory).

The software libraries 512 can be thought of as suites of data and programming code, including executables, used to control the computing resources of the hardware platform 510. The programming code can include low-level primitives (e.g., fundamental language elements) that form the foundation of one or more low-level programming languages (such as C, C++, Assembly, or CUDA), such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library (MKL), NVIDIA cuDNN (CUDA Deep Neural Network library), EIGEN (a C++ template library for linear algebra), and OpenBLAS (an optimized BLAS library).

The structure layer 504 can include an AI/ML framework 514 and an algorithm 516. The AI/ML framework 514 can be thought of as an interface, library, or tool that allows users to build and deploy the AI model. The AI/ML framework 514 can include an open-source library (such as TensorFlow, PyTorch, or scikit-learn), an application programming interface (API) (such as REST APIs, GraphQL, or gRPC interfaces), a gradient-boosting library (such as XGBoost, LightGBM, or CatBoost), an ensemble method (such as Random Forest, AdaBoost, or Voting Classifiers), and/or a deep learning toolkit (such as Keras, PyTorch Lightning, or Hugging Face Transformers) that work with the layers of the AI system facilitate development of the AI model. For example, the AI/ML framework 514 can distribute processes for application or training of the AI model across multiple resources in the hardware platform 510. The AI/ML framework 514 can also include a set of pre-built components that have the functionality to implement and train the AI model and allow users to use pre-built functions and classes to construct and train the AI model. Thus, the AI/ML framework 514 can be used to facilitate data engineering (using tools such as Apache Spark, Pandas, or Dask), development (using IDEs such as Jupyter Notebooks, PyCharm, or VS Code), hyperparameter tuning (using libraries such as Optuna, Hyperopt, or Ray Tune), testing (using frameworks such as pytest, unittest, or MLflow), and training (using distributed training frameworks such as Horovod, DeepSpeed, or FairScale) for the AI model. Examples of AI/ML frameworks 514 that can be used in the AI system 500 include TENSORFLOW (Google's open-source machine learning framework), PYTORCH (Facebook's deep learning framework), SCIKIT-LEARN (a Python machine learning library), KERAS (a high-level neural networks API), LightGBM (Microsoft's gradient boosting framework), RANDOM FOREST (an ensemble learning method), and AMAZON WEB SERVICES (cloud-based ML services such as SageMaker).

The algorithm 516 can be an organized set of computer-executable operations used to generate output data from a set of input data and can be described using pseudocode (or implemented in programming languages such as Python, R, Java, or C++). The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning (with labeled datasets), unsupervised learning (with unlabeled data for pattern discovery), semi-supervised learning (combining labeled and unlabeled data), and/or reinforcement learning (learning through interaction with an environment).

Using supervised learning, the algorithm 516 can be trained to learn patterns (e.g., map input data to output data) based on labeled training data. The training data may be labeled by an external user or operator (or through automated labeling systems, crowdsourcing platforms, or weak supervision techniques). For instance, a user may collect a set of training data, such as by capturing data from sensors (loT devices, environmental sensors, or industrial equipment), images from a camera (digital cameras, smartphones, or surveillance systems), outputs from a model (predictions, classifications, or generated content), and the like. Furthermore, training data can include original or transformed session objects and metadata, credit data, connectivity data, framework data, user objects and metadata, input artifacts, output artifacts, node collections, vulnerability data, component data, policy data, remediation data, agent definitions, chat history, ontologies, variable descriptions, embeddings, vectors, indexes, training information (inputs, outputs, validation information such as scores), thresholds, and the like. The platform can enable automatic or manual labeling of the training data based on one or more classes (categorical labels, numerical targets, or multi-label classifications) and trains the AI model by inputting the training data into the algorithm 516. The algorithm determines how to label the new data based on the labeled training data. The user can facilitate collection, labeling, and/or input via the AI/ML framework 514. In some instances, the user may convert the training data to a set of feature vectors (numerical representations, embeddings, or engineered features) for input to the algorithm 516. Once trained, the user can test the algorithm 516 on new data to determine if the algorithm 516 is predicting accurate labels for the new data. For example, the platform can enable the use of cross-validation methods (k-fold, stratified, or time series cross-validation) to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with elements derived from any of: session objects and metadata, credit data, connectivity data, framework data, user objects and metadata, input artifacts, output artifacts, node collections, vulnerability data, component data, policy data, remediation data, agent definitions, chat history, ontologies, variable descriptions, embeddings, vectors, indexes, training information (inputs, outputs, validation information such as scores), thresholds, and the like.

in the context of the architecture ingestion and decoder framework, the algorithm 516 can be trained using classification techniques to identify and categorize architectural component icons within uploaded architecture diagrams. The training data can include labeled examples of service icons representing servers, databases, load balancers, APIs, microservices, containers, virtual machines, storage systems, identity providers, message queues, and network devices such as routers, switches, and gateways. The algorithm 516 can learn to classify detected visual elements into predefined icon categories, enabling the image processor agent to extract service identifications and generate structured representations of architectural components from input diagram images.

In the context of the vulnerability framework, the algorithm 516 can be trained using classification techniques to identify and categorize vulnerability patterns within extracted architectural arrangements. The training data can include labeled examples of vulnerability patterns such as missing encryption services between data storage and application components, inadequate access control configurations between public-facing load balancers and internal databases, insufficient monitoring capabilities for compute and storage services, and non-compliant network segmentation patterns that expose sensitive resources to unauthorized access. The algorithm 516 can learn to classify extracted architectural component arrangements into predefined vulnerability categories, enabling the policy application agent to identify security gaps and generate vulnerability reports with associated remediation recommendations.

In the context of the architecture regeneration framework, the algorithm 516 can be trained using classification and sequence generation techniques to produce domain-specific language code for architecture diagram generation. The training data can include labeled examples of domain-specific language code structures representing service definitions, cluster organizations, inter-service connections, and security component embeddings such as web application firewalls, encryption key management services, identity and access management services, and audit logging services. The algorithm 516 can learn to generate syntactically correct domain-specific language code that incorporates security enhancements based on identified vulnerabilities and applicable compliance policies, enabling the diagram generator agent to produce security-enhanced architecture diagrams through automated code synthesis and rendering operations.

Once trained, the algorithm 516 can categorize new input data by analyzing the data for features that map to categories. Examples of classification techniques include boosting (AdaBoost, Gradient Boosting, XGBoost), decision tree learning (CART, C4.5, Random Forest), genetic programming (evolutionary algorithms for program synthesis), learning vector quantization (LEV, a neural network-based method), k-nearest neighbor (k-NN) algorithm (distance-based classification), and statistical classification (logistic regression, naive Bayes, support vector machines).

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression (simple and multiple linear regression), multiple linear regression (with multiple independent variables), logistic regression (for binary or categorical outcomes), regression tree analysis (decision trees for regression), least squares method (ordinary least squares, weighted least squares), and gradient descent (optimization algorithm for parameter estimation). In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format.

A few techniques can be used in unsupervised learning: clustering, anomaly detection, and techniques for learning latent variable models. Clustering techniques involve grouping data into different clusters that include similar data, such that other clusters contain dissimilar data. For example, during clustering, data with possible similarities remains in a group that has less or no similarities to another group. Examples of clustering techniques density-based methods include density-based methods (such as DBSCAN or OPTICS), hierarchical based methods (such as agglomerative or divisive clustering), partitioning methods (such as k-means or k-medoids), and grid-based methods (such as STING or CLIQUE). In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest (an ensemble method for anomaly detection), local outlier factor (LOF) algorithm (density-based anomaly detection), or K-nearest neighbor (k-NN) algorithm (distance-based anomaly detection). Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis (dimensionality reduction technique), item response theory (psychometric modeling), latent profile analysis (mixture modeling for continuous variables), and latent class analysis (mixture modeling for categorical variables).

Instead of or in addition to supervised and unsupervised learning, the algorithm 516 can also be trained using reinforcement learning, where the model learns to take actions to maximize a reward signal (using techniques such as Q-learning, policy gradients, or actor-critic methods). For example, in the context of the security architecture review automation platform, the algorithm 516 can be trained using reinforcement learning to optimize the iterative refinement of security-enhanced architecture diagrams. The reinforcement learning agent can receive a state representation comprising the current architectural arrangement, identified vulnerabilities, and applicable compliance policies. The agent can take actions corresponding to architectural modifications such as inserting security components, reconfiguring network segmentation, or adjusting access control configurations. The reward signal can be computed based on the reduction in identified vulnerabilities, the degree of compliance with security policies, and the preservation of functional connectivity within the architecture. Through iterative interaction with the architecture review environment, the algorithm 516 can learn policies that efficiently transform input architectures into security-compliant configurations while minimizing unnecessary modifications and maintaining architectural coherence.

The model layer 506 implements the AI model using data from the data layer and the algorithm 516 and AI/ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees (CART, C4.5, Random Forest), support vector machines (SVM with various kernels), regression analyses (linear, logistic, polynomial regression), Bayesian networks (probabilistic graphical models), Gaussian processes (non-parametric Bayesian models), genetic algorithms (evolutionary optimization), and artificial neural networks (feedforward, convolutional, recurrent networks) (or, simply, neural networks). The model structure 520 can include a number of structure layers, a number of nodes (or neurons) at each structure layer, and activation functions (such as ReLU, sigmoid, tanh, or softmax) of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks (multilayer perceptrons), convolutional neural networks (CNNs) (for image and spatial data processing), Recurrent Neural Networks (RNNs) (including LSTM and GRU variants), Autoencoders (for dimensionality reduction and feature learning), and Generative Adversarial Networks (GANs) (for generative modeling).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights (typically represented as floating-point numbers or matrices) determine the strength of the nodes and the biases (scalar values added to weighted inputs) determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the AI/ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function (for binary classification), hinge loss function (for support vector machines), regression loss function (e.g., mean square error (MSE), quadratic loss, etc.), mean absolute error function (MAE), smooth mean absolute error function (Huber loss), log-cosh loss function (smooth approximation of MAE), and quantile loss function (for quantile regression).

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD) (batch, stochastic, mini-batch variants), Adaptive Gradient Algorithm (AdaGrad) (adaptive learning rate optimization), Adaptive Moment Estimation (Adam) (combining momentum and adaptive learning rates), Root Mean Square Propagation (RMSprop) (adaptive learning rate method), Radial Base Function (RBF) (for neural network training) and Limited-memory BFGS (L-BFGS) (quasi-Newton optimization method). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The regularization engine 528 can apply one or more regularization techniques to fit the algorithm 516 to the training data properly, which helps constraint the resulting AI model and improves its ability for generalized application. Examples of regularization techniques include lasso (L1) regularization (promoting sparsity in model parameters), ridge (L2) regularization (penalizing large parameter values), and elastic (L1 and L2 regularization) net regularization (combining L1 and L2 penalties).

The application layer 508 describes how the AI system 500 is used to solve problems or perform tasks. In an example implementation, the application layer 508 can be communicatively coupled to an interactable user interface of the platform 100.

One such example is the security architecture review automation platform, wherein the application layer 508 can implement the interactive chat session that enables end users to submit architecture artifacts, receive vulnerability analysis results, provide feedback on remediation recommendations, and interact with the platform using natural language inputs. The application layer 508 can invoke the trained AI model to process uploaded architecture diagrams through the image processor agent, perform compliance validation through the policy application agent, and generate security-enhanced architecture diagrams through the diagram generator agent. The application layer 508 can present vulnerability reports, remediation recommendations, and regenerated architecture visualizations through user-interactive frameworks rendered on display devices.

In another example, the application layer 508 can implement third-party risk management functionality, wherein the AI system 500 assesses risks associated with external vendors, libraries, and services used in architecture. The application layer 508 can evaluate compliance, data handling practices, and potential vulnerabilities introduced by third-party components, and can automatically flag risky dependencies and suggest mitigation strategies through the user-interactive framework.

In another example, the application layer 508 can implement business impact and security risk assessment functionality, wherein the AI system 500 evaluates the potential business impact of architectural decisions. The application layer 508 can assess how changes or vulnerabilities could affect operations, data integrity, and customer trust, and can prioritize risks based on severity and business criticality to support informed decision-making by end users.

In another example, the application layer 508 can implement application security assessment functionality, wherein the AI system 500 performs automated security reviews of application components. The application layer 508 can scan for common vulnerabilities, insecure configurations, and weak authentication flows, and can integrate with static and dynamic analysis tools to provide deeper insights into code-level risks through the trained AI model.

In another example, the application layer 508 can implement open-source software security review functionality, wherein the AI system 500 analyzes open-source dependencies used in architecture. The application layer 508 can check for known vulnerabilities, license compliance issues, and outdated packages, and can generate automated alerts and remediation suggestions to maintain a secure and compliant open-source software ecosystem within the application.

Example Transformer for Machine Learning Models

To assist To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight" represented as floating-point numbers or matrices) whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections (recurrent connections), skip connections (residual connections), and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs) (for image and spatial data processing), recurrent neural networks (RNNs) (for sequential data processing), multilayer perceptrons (MLPs) (feedforward neural networks), Generative Adversarial Networks (GANs) (for generative modeling), Variational Autoencoders (VAEs) (for probabilistic generative modeling), and Auto-regressive Models (for sequential prediction), among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights stored as numerical arrays or tensors) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus) (stored in formats such as plain text, JSON, XML, or structured databases). The corpus may represent a language domain (e.g., a single language), a subject domain (e.g., vulnerability data, policy data, information security data), and/or may encompass another domain or domains, be they larger or smaller than a single language or subject domain. Training data may be labeled with ground-truth annotations-categorical tags, numerical scores, or structured markup—that capture various aspects of the data, such as vulnerability categories, aspects of policy, system controls, and so forth. These labels enable the platform to train models that understand artifacts, extract or generate component information using artifact data, extract or generate relationships and dependencies using artifact data, generate artifact node collections using input artifacts and artifact data, and apply vulnerability constraints, policy constraints, and system controls to perform security architecture review and generate remediation recommendations.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder for unsupervised learning), or can be a measure of some target observable effect on the environment (e.g., in the case of a reinforcement learning agent interacting with a simulated or real environment). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward represented as numerical values) in order to bring the output value as close to the target value as possible. The goal of training the ML model typically is to minimize a loss function or maximize a reward function.

The training data may be a subset of a larger data set. For example, a data set may be split into three mutually exclusive subsets: a training set (typically 60-80% of the data), a validation (or cross-validation) set (typically 10-20% of the data), and a testing set (typically 10-20% of the data). The three subsets of data may be used sequentially during ML model training. For example, the training set may be first used to train one or more AI/ML models, each ML model, e.g., having a particular architecture (neural network topology, layer types, activation functions), having a particular training procedure (optimization algorithm, learning rate schedule, batch size), being describable by a set of model hyperparameters (learning rate, regularization strength, network depth), and/or otherwise being varied from the other of the one or more AI/ML models. The validation (or cross-validation) set may then be used as input data into the trained AI/ML models to, e.g., measure the performance of the trained AI/ML models and/or compare performance between them. Where hyperparameters are used, a new set of hyperparameters may be determined based on the measured performance of one or more of the trained AI/ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more AI/ML models are possible.

Backpropagation is an algorithm for training an ML model. Backpropagation is used to adjust (also referred to as update or modify) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model (using chain rule of calculus), and a gradient algorithm (e.g., gradient descent or its variants such as Adam, RMSprop, or AdaGrad) is used to update (i.e., "learn") the parameters to reduce the loss function. Backpropagation is performed iteratively so that the loss function is converged or minimized. Other techniques for learning the parameters of the ML model may be used (such as evolutionary algorithms, Bayesian optimization, or reinforcement learning). The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value within a specified tolerance), after which the ML model is considered to be sufficiently trained. The values of the learned parameters may then be fixed and the ML model may be deployed to generate output in real-world applications (also referred to as "inference" or prediction phase).

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on text corpora may be, e.g., fine-tuned by further training using specific training samples (domain-specific datasets, task-specific examples, user-generated content, session feedback). The specific training samples can be used to generate language in a certain style or in a certain format.

Some concepts in ML-based language models are now discussed. It may be noted that, while the term "language model" has been commonly used to refer to a ML-based language model, there could exist non-ML language models (such as n-gram models or rule-based systems). In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model typically relies on a deep neural network-often a DNN—to handle natural-language processing tasks. By learning the probabilistic relationships between words in a sequence, the model acquires a statistical or neural representation of language that can involve hundreds of thousands of parameters for smaller models, and millions or billions for large language models (LLMs).

In recent years, there has been interest in a type of neural network architecture, referred to as a transformer, for use as language models. For example, the Bidirectional Encoder Representations from Transformers (BERT) model (Google's transformer-based model), the Transformer-XL model (extended context transformer), and the Generative Pre-trained Transformer (GPT) models (OpenAI's autoregressive language models) are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models (including LSTM and GRU variants).

Figure 6:
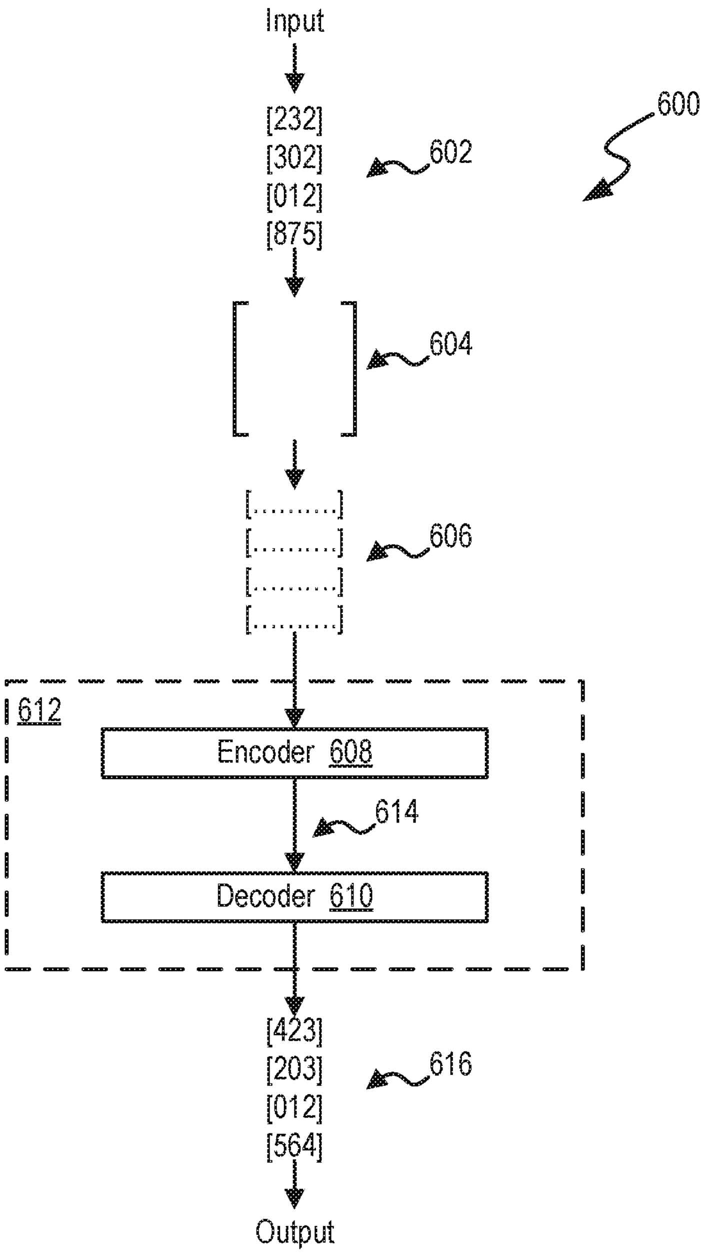
FIG. 6 is a block diagram of an example transformer that can implement aspects of the present technology.

FIG. 6 is a block diagram of an example transformer 612 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence (using attention weights computed through query, key, and value matrices). Although transformer-based language models are described herein, it should be understood that the present disclosure may be applicable to any AI/ML-based language model, including language models based on other neural network architectures such as recurrent neural network (RNN)-based language models.

The nodes of node collections can be stored in key-value pairs with associated metadata, wherein each node identifier serves as a key and the corresponding value comprises node attributes including component type, configuration parameters, security classifications, and relationship identifiers. Node collections can be represented as graph data structures wherein nodes correspond to architectural components and edges correspond to connections, data flows, or dependencies between components. The transformer 612 can be applied to graph data through graph transformer architectures that extend self-attention mechanisms to operate over graph-structured inputs. In the context of generating the dynamically generated node collection, the transformer 612 can receive as input a graph representation of the input node collection comprising node embeddings and edge embeddings derived from the extracted architectural components and their interconnections. The transformer 612 can apply graph attention layers that compute attention weights between connected nodes, enabling the model to aggregate information from neighboring nodes while considering the structural relationships encoded in the graph topology. The transformer 612 can process policy data and vulnerability data as conditioning inputs that guide the generation of output graph structures. For example, the transformer 612 can receive policy embeddings retrieved from the vector database and vulnerability embeddings derived from the vulnerability set, and can use cross-attention mechanisms to attend to these conditioning inputs while generating modified node representations. The transformer 612 can generate the dynamically generated node collection by predicting new nodes corresponding to security components such as web application firewalls, encryption key management services, and identity and access management services, predicting new edges representing connections between existing nodes and the newly generated security nodes, and setting, adding, or modifying existing node attributes to incorporate security-compliant configurations. The output of the transformer 612 can be decoded into a structured graph representation comprising updated key-value pairs for each node, updated edge lists specifying connections between nodes, and updated metadata reflecting compliance status and applied security policies.

The transformer 612 comprises an encoder 608 (one or more encoder layers/blocks in series) and a decoder 610 (one or more decoder layers/blocks in series). Both encoder and decoder contain multiple neural-network layers, at least one of which is a self-attention (multi-head) layer, and the collective set of layer parameters constitutes the language-model parameters.

In some implementations, the transformer 612 can perform code generation operations. Code generation can involve creating executable code snippets based on natural language input, such as generating a function or a class in a specific programming language (Python, Java, JavaScript, C++, or SQL). For instance, given the input "create a function that takes a list of numbers and returns the average," the transformer 612 can generate the requested function (in the specified programming language with appropriate syntax). The generated code can then be fine-tuned or modified by the user to suit their specific needs. The transformer 612 can also generate code for data processing (ETL pipelines, data cleaning, or analysis scripts), machine learning (model training, evaluation, or deployment code), web development (HTML, CSS, JavaScript, or backend code), and other applications.

In the context of the policy application agent 167, the transformer 612 can perform code generation operations for generating compliance validation prompts and vulnerability analysis queries. The policy application agent 167 can invoke the transformer 612 with constructed prompts that include extracted services, relationships, retrieved policies, and environment-specific instructions. The transformer 612 can generate structured vulnerability reports by processing the input prompt through the encoder 608 to generate contextual representations of the architectural components and policy requirements, and through the decoder 610 to generate natural language descriptions of identified vulnerabilities, affected components, and remediation recommendations. The transformer 612 can be fine-tuned on security policy corpora and vulnerability pattern datasets to improve accuracy in identifying compliance violations and generating actionable remediation guidance.

In the context of the diagram generator agent 168, the transformer 612 can perform code generation operations for generating domain-specific language code for architecture diagram generation. The diagram generator agent 168 can invoke the transformer 612 with prompt templates that include extracted services, connections, identified vulnerabilities, and security enhancement requirements. The transformer 612 can generate syntactically correct domain-specific language code by processing the input through the encoder 608 to encode the architectural context and security requirements, and through the decoder 610 to auto-regressively generate code tokens representing service definitions, cluster organizations, inter-service connections, and security component embeddings. The transformer 612 can be trained on code corpora comprising domain-specific language examples annotated with architectural patterns, security component placements, and connection specifications to enable accurate code synthesis for architecture diagram rendering.

The transformer 612 can be trained on a corpus that is labeled (e.g., annotated to indicate verbs, nouns, code elements (functions, variables, classes), keywords (reserved words in programming languages), commands (executable instructions), syntax structures (grammatical or code structure annotations)) or unlabeled. Large language models (LLMs) can be trained on a large unlabeled corpus (using unsupervised learning techniques). The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

Because GPT-type language models tend to have a large number of parameters (billions or trillions of parameters), these language models can be considered LLMs. An example of a GPT-type LLM is GPT-3 (with 175 billion parameters). GPT-3 is a type of GPT language model that has been trained (in an unsupervised manner) on a large corpus derived from documents available to the public online (web pages, books, articles, and other text sources). GPT-3 has a very large number of learned parameters (on the order of hundreds of billions), is able to accept a large number of tokens as input (e.g., up to 2,048 input tokens in the original version, with newer models supporting longer contexts), and is able to generate a large number of tokens as output (e.g., up to 2,048 tokens or more in newer versions). GPT-3 has been trained as a generative model, meaning that it can process input text sequences to predictively generate a meaningful output text sequence. ChatGPT (a conversational AI system) is built on top of a GPT-type LLM and has been fine-tuned with training datasets based on text-based chats (e.g., chatbot conversations using reinforcement learning from human feedback). ChatGPT is designed for processing natural language, receiving chat-like inputs, and generating chat-like outputs.

A computer system can access a remote language model (e.g., a cloud-based language model), such as ChatGPT or GPT-3 (or other models such as Claude, Gemini, or LLAMA), via a software interface (e.g., an API such as REST API, GraphQL, or gRPC). Additionally or alternatively, such a remote language model can be accessed via a network such as, for example, the Internet (using HTTP/HTTPS protocols). In some implementations, such as, for example, potentially in the case of a cloud-based language model, a remote language model can be hosted by a computer system that can include a plurality of cooperating (e.g., cooperating via a network) computer systems that can be in, for example, a distributed arrangement (using distributed computing frameworks or cloud infrastructure). Notably, a remote language model can employ a plurality of processors (e.g., hardware processors such as, for example, processors of cooperating computer systems including CPUs, GPUs, or TPUs). Indeed, processing of inputs by an LLM can be computationally expensive/can involve a large number of operations (e.g., many instructions can be executed/large data structures can be accessed from memory requiring significant computational resources), and providing output in a required timeframe (e.g., real time or near real time typically measured in milliseconds or seconds) can require the use of a plurality of processors/cooperating computing devices as discussed above.

Inputs to an LLM can be referred to as a prompt, which is a natural language input that includes instructions to the LLM to generate a desired output (formatted as text strings, structured templates, or JSON objects). A computer system can generate a prompt that is provided as input to the LLM via its API. As described above, the prompt can be processed or pre-processed into a token sequence (using tokenization algorithms such as BPE, WordPiece, or SentencePiece) prior to being provided as input to the LLM via its API. A prompt can include one or more examples of the desired output (demonstration examples or templates), which provides the LLM with additional information to enable the LLM to generate output according to the desired output. Additionally or alternatively, the examples included in a prompt can provide inputs corresponding to/as can be expected to result in the desired outputs provided. A one-shot prompt refers to a prompt that includes one example (single demonstration), and a few-shot prompt refers to a prompt that includes multiple examples (typically 2-10 examples). A prompt that includes no examples can be referred to as a zero-shot prompt (relying solely on the model's pre-trained knowledge).

Although a general transformer architecture for a language model and its theory of operation have been described above, this is not intended to be limiting. Existing language models include language models that are based only on the encoder of the transformer (encoder-only models) or only on the decoder of the transformer (decoder-only models). An encoder-only language model encodes the input text sequence into feature vectors that can then be further processed by a task-specific layer (e.g., a classification layer for named entity recognition, component recognition, and the like). BERT (Bidirectional Encoder Representations from Transformers) is an example of a language model that can be considered to be an encoder-only language model. A decoder-only language model accepts embeddings as input and can use auto-regression (predicting next tokens based on previous tokens) to generate an output text sequence. Transformer-XL (extended context transformer) and GPT-type models (Generative Pre-trained Transformers) can be language models that are considered to be decoder-only language models.

Example Computer System

Figure 7:
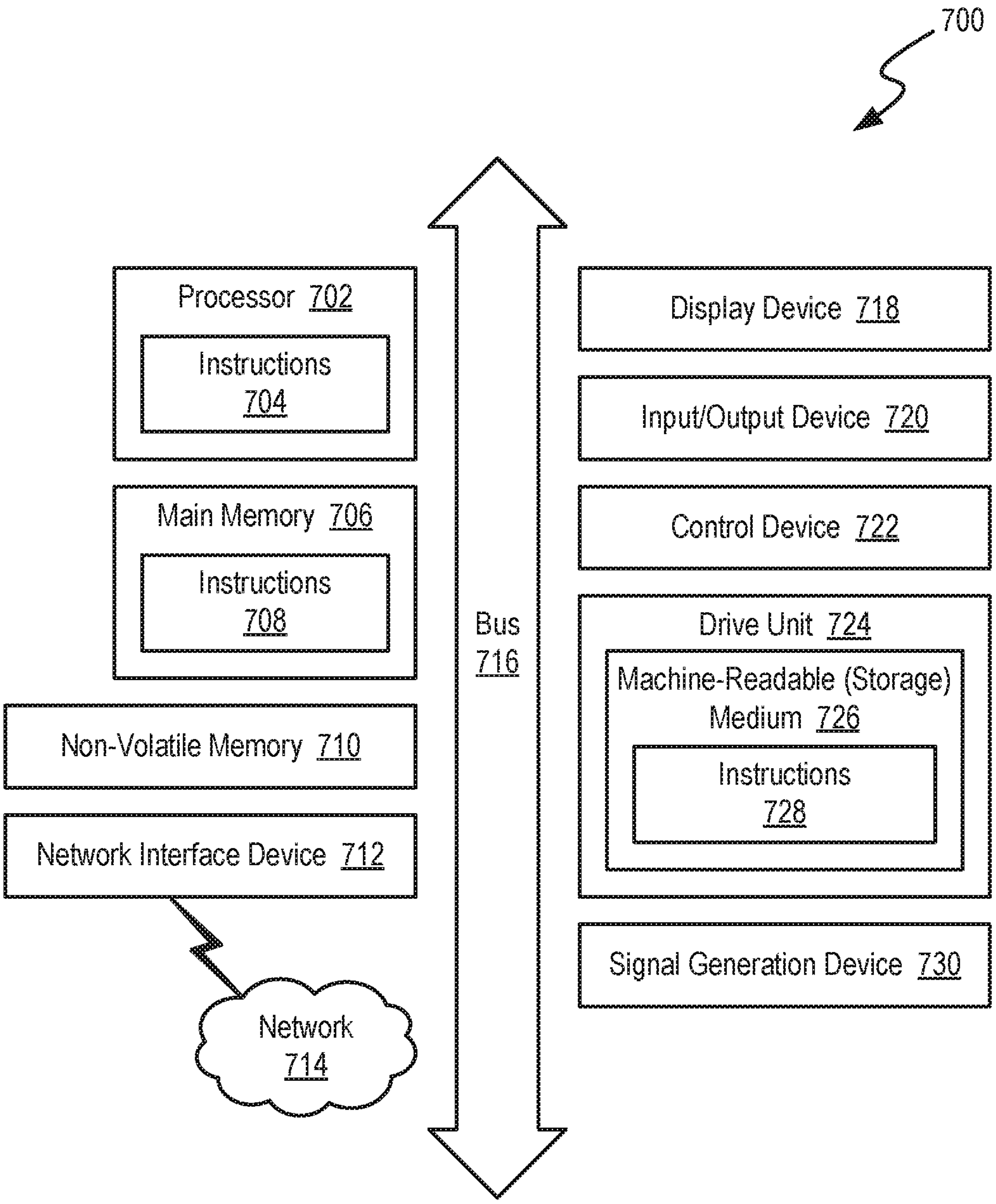
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A computing system comprising at least one data processor, at least one memory, and one or more non-transitory, computer-readable storage media excluding transitory signals and comprising instructions recorded thereon, wherein the instructions, when executed by the at least one data processor, cause the computing system to generate a security architecture, comprising performing operations to:

receive an architecture artifact comprising a system architecture image;

apply a computer vision model to the system architecture image to extract an architectural component set and interconnection information, wherein the architectural component set comprises icons associated with service names, and wherein the interconnection information comprises directionality information for connections between icons;

generate a node collection based on the extracted architectural component set and the interconnection information, wherein the node collection comprises nodes representing the architectural component set and edges representing the interconnection information;

perform vulnerability analysis on the node collection by:

transforming nodes in the node collection into vector embeddings; and performing policy embedding search operations using vector similarity matching against a vector database storing policy data to retrieve compliance policies and generate a vulnerability report;

generate a vulnerability artifact comprising a component set, a vulnerability set, and a policy item set associated with vulnerabilities in the vulnerability set;

apply an artificial intelligence model to the vulnerability artifact to generate a remediation recommendation specifying architectural changes to address the vulnerabilities;

generate, by an artificial intelligence architecture generator, a dynamically generated node collection representing a security-enhanced architecture by embedding security components into the node collection based on the vulnerability set, the remediation recommendation, and the compliance policies; and generate domain-specific language code based on the dynamically generated node collection, wherein the domain-specific language code is executable to render a visual architecture diagram.

2. The computing system of claim 1, the operations further comprising:

present the remediation recommendation to a user through an interactive chat session;

receive user feedback indicating modification of the remediation recommendation;

perform sentiment analysis on the user feedback to classify a user intent; and based on the user intent indicating modification, perform operations comprising:

construct prompts comprising the user feedback and current architecture data; and regenerate a portion of the dynamically generated node collection based on the user feedback.

3. The computing system of claim 1, the operations further comprising:

select a prompt template based on a complexity metric derived from the dynamically generated node collection;

execute the domain-specific language code to render the visual architecture diagram; and responsive to detecting an execution error, perform normalization operations comprising resolve missing service definitions and regenerate the domain-specific language code through a set of iterative correction cycles.

4. The computing system of claim 1, the wherein generating the node collection comprises operations to:

encode the architecture artifact for processing by the computer vision model;

invoke the computer vision model to perform image analysis comprising operations to identify icons and corresponding labels, recognize connection patterns between services, and extract service names from text labels;

receive a transcript associated with the architecture artifact;

extract and normalize transcript content; and generate the node collection comprising clusters, services, connections, and directional flow indicators based on the image analysis and the transcript content.

5. The computing system of claim 1, wherein performing the vulnerability analysis comprises operations to:

transform the architectural component set and the interconnection information into the vector embeddings;

retrieve the compliance policies from the vector database, the compliance policies comprising policies related to authentication, data encryption, network security, and monitoring;

invoke a neural network with prompts comprising the architectural component set, the compliance policies, and environment-specific instructions to perform compliance validation; and identify the vulnerabilities by comparing the architectural component set against vulnerability patterns stored in the vector database.

6. The computing system of claim 1, wherein generating the dynamically generated node collection comprises operations to:

receive the node collection, the vulnerability report, and a set of compliance policies;

invoke a second neural network with prompt templates comprising the architectural component set, the interconnection information, the vulnerabilities, and security enhancement requirements;

parse an existing code structure of the node collection to identify service definitions and connection specifications;

identify missing services based on the remediation recommendation by comparing the architectural component set against required security services specified in the remediation recommendation;

embed the security components into the node collection, the security components comprising web application firewalls, encryption key management services, identity and access management services, audit logging services, monitoring services, network firewalls, and virtual private network endpoints;

create inter-service connections between the security components and the architectural component set by adding edges to the node collection; and organize services into logical clusters based on functional groupings to generate the dynamically generated node collection.

7. One or more non-transitory, computer-readable storage media excluding transitory signals and comprising instructions recorded thereon, wherein the instructions, when executed by at least one data processor of a computing system, cause the computing system to generate a security architecture, comprising:

receiving an architecture artifact comprising a system architecture image;

applying a computer vision model to the system architecture image to extract an architectural component set and interconnection information, wherein the architectural component set comprises icons associated with service names, and wherein the interconnection information comprises directionality information for connections between icons;

generating a node collection based on the extracted architectural component set and the interconnection information, wherein the node collection comprises nodes representing the architectural component set and edges representing the interconnection information;

performing vulnerability analysis on the node collection by:

transforming nodes in the node collection into vector embeddings; and performing policy embedding search operations using vector similarity matching against a vector database storing policy data to retrieve compliance policies and generate a vulnerability report;

generating a vulnerability artifact comprising a component set, a vulnerability set, and a policy item set associated with vulnerabilities in the vulnerability set;

applying an artificial intelligence model to the vulnerability artifact to generate a remediation recommendation specifying architectural changes to address the vulnerabilities;

generating, by an artificial intelligence architecture generator, a dynamically generated node collection representing a security-enhanced architecture by embedding security components into the node collection based on the vulnerability set, the remediation recommendation, and the compliance policies; and generating domain-specific language code based on the dynamically generated node collection, wherein the domain-specific language code is executable to render a visual architecture diagram.

8. The one or more non-transitory, computer-readable storage media of claim 7, wherein the operations further comprise:

presenting the remediation recommendation to a user through an interactive chat session;

receiving user feedback indicating modification of the remediation recommendation;

performing sentiment analysis on the user feedback to classify a user intent; and based on the user intent indicating modification, performing operations comprising:

constructing prompts comprising the user feedback and current architecture data; and regenerating a portion of the dynamically generated node collection based on the user feedback.

9. The one or more non-transitory, computer-readable storage media of claim 7, wherein the operations further comprise:

selecting a prompt template based on a complexity metric derived from the dynamically generated node collection;

executing the domain-specific language code to render the visual architecture diagram; and responsive to detecting an execution error, performing normalization operations comprising resolving missing service definitions and regenerating the domain-specific language code through a set of iterative correction cycles.

10. The one or more non-transitory, computer-readable storage media of claim 7, wherein generating the node collection comprises:

encoding the architecture artifact for processing by the computer vision model;

invoking the computer vision model to perform image analysis comprising operations to identify icons and corresponding labels, recognize connection patterns between services, and extract service names from text labels;

receiving a transcript associated with the architecture artifact;

extracting and normalizing transcript content; and generating the node collection comprising clusters, services, connections, and directional flow indicators based on the image analysis and the transcript content.

11. The one or more non-transitory, computer-readable storage media of claim 7, wherein performing the vulnerability analysis comprises:

transforming the architectural component set and the interconnection information into the vector embeddings;

retrieving the compliance policies from the vector database, the compliance policies comprising policies related to authentication, data encryption, network security, and monitoring;

invoking a neural network with prompts comprising the architectural component set, the compliance policies, and environment-specific instructions to perform compliance validation; and identifying the vulnerabilities by comparing the architectural component set against vulnerability patterns stored in the vector database.

12. The one or more non-transitory, computer-readable storage media of claim 7, wherein generating the dynamically generated node collection comprises:

receiving the node collection, the vulnerability report, and a set of compliance policies;

invoking a second neural network with prompt templates comprising the architectural component set, the interconnection information, the vulnerabilities, and security enhancement requirements;

parsing an existing code structure of the node collection to identify service definitions and connection specifications;

identifying missing services based on the remediation recommendation by comparing the architectural component set against required security services specified in the remediation recommendation;

embedding the security components into the node collection, the security components comprising web application firewalls, encryption key management services, identity and access management services, audit logging services, monitoring services, network firewalls, and virtual private network endpoints;

creating inter-service connections between the security components and the architectural component set by adding edges to the node collection; and organizing services into logical clusters based on functional groupings to generate the dynamically generated node collection.

13. The one or more non-transitory, computer-readable storage media of claim 12, wherein generating the dynamically generated node collection further comprises:

performing code validation operations by invoking a review agent to perform quality assurance checks on the dynamically generated node collection;

when the review agent identifies issues, performing code correction operations to address syntax errors and structural deficiencies; and performing subsequent review iterations until the dynamically generated node collection satisfies predefined quality criteria.

14. A computer-implemented method for generating a security architecture, the method comprising:

receiving an architecture artifact comprising a system architecture image set;

applying a computer vision model to the system architecture image set to extract an architectural component set and interconnection information, wherein the architectural component set comprises icons associated with service names, and wherein the interconnection information comprises directionality information for connections between icons;

generating a node collection based on the extracted architectural component set and the interconnection information, wherein the node collection comprises nodes representing the architectural component set and edges representing the interconnection information;

performing vulnerability analysis on the node collection to generate a vulnerability report by:

transforming nodes in the node collection into vector embeddings; and performing policy embedding search operations using vector similarity matching against a vector database storing policy data to retrieve compliance policies; and generating the vulnerability report using the policy embedding search operations;

generating a vulnerability artifact comprising a component set, a vulnerability set, and a policy item set associated with vulnerabilities in the vulnerability set;

applying an artificial intelligence model to the vulnerability artifact to generate a remediation recommendation specifying architectural changes to address the vulnerabilities;

generating, by an artificial intelligence architecture generator, a dynamically generated node collection representing a security-enhanced architecture by embedding security components into the node collection based on the vulnerability set, the remediation recommendation, and the compliance policies; and generating domain-specific language code based on the dynamically generated node collection, wherein the domain-specific language code is executable to render a visual architecture diagram.

15. The computer-implemented method of claim 14, further comprising:

presenting the remediation recommendation to a user through an interactive chat session;

receiving user feedback indicating modification of the remediation recommendation;

performing sentiment analysis on the user feedback to classify a user intent; and based on the user intent indicating modification, performing operations comprising:

constructing prompts comprising the user feedback and current architecture data; and regenerating a portion of the dynamically generated node collection based on the user feedback.

16. The computer-implemented method of claim 14, further comprising:

selecting a prompt template based on a complexity metric derived from the dynamically generated node collection;

executing the domain-specific language code to render the visual architecture diagram; and responsive to detecting an execution error, performing normalization operations comprising resolving missing service definitions and regenerating the domain-specific language code through a set of iterative correction cycles.

17. The computer-implemented method of claim 14, wherein generating the node collection comprises:

encoding the architecture artifact for processing by the computer vision model;

invoking the computer vision model to perform image analysis comprising operations to identify icons and corresponding labels, recognize connection patterns between services, and extract service names from text labels;

receiving a transcript associated with the architecture artifact;

extracting and normalizing transcript content; and generating the node collection comprising clusters, services, connections, and directional flow indicators based on the image analysis and the transcript content.

18. The computer-implemented method of claim 14, wherein performing the vulnerability analysis comprises:

transforming the architectural component set and the interconnection information into the vector embeddings;

retrieving the compliance policies from the vector database, the compliance policies comprising policies related to authentication, data encryption, network security, and monitoring;

invoking a neural network with prompts comprising the architectural component set, the compliance policies, and environment-specific instructions to perform compliance validation; and identifying the vulnerabilities by comparing the architectural component set against vulnerability patterns stored in the vector database.

19. The computer-implemented method of claim 14, wherein generating the dynamically generated node collection comprises:

receiving the node collection, the vulnerability report, and a set of compliance policies;

invoking a second neural network with prompt templates comprising the architectural component set, the interconnection information, the vulnerabilities, and security enhancement requirements;

parsing an existing code structure of the node collection to identify service definitions and connection specifications;

identifying missing services based on the remediation recommendation by comparing the architectural component set against required security services specified in the remediation recommendation;

embedding the security components into the node collection, the security components comprising web application firewalls, encryption key management services, identity and access management services, audit logging services, monitoring services, network firewalls, and virtual private network endpoints;

creating inter-service connections between the security components and the architectural component set by adding edges to the node collection; and organizing services into logical clusters based on functional groupings to generate the dynamically generated node collection.

20. The computer-implemented method of claim 19, wherein generating the dynamically generated node collection further comprises:

performing code validation operations by invoking a review agent to perform quality assurance checks on the dynamically generated node collection;

when the review agent identifies issues, performing code correction operations to address syntax errors and structural deficiencies; and performing subsequent review iterations until the dynamically generated node collection satisfies predefined quality criteria.

* * * * *